United States Patent
Zhou et al.

(10) Patent No.: US 12,413,290 B2
(45) Date of Patent: Sep. 9, 2025

(54) TECHNIQUES FOR INTERFERENCE-BASED BEAM FAILURE DETECTION

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Aleksandar Damnjanovic, Del Mar, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 797 days.

(21) Appl. No.: 17/331,409

(22) Filed: May 26, 2021

(65) Prior Publication Data

US 2022/0385351 A1    Dec. 1, 2022

(51) Int. Cl.
*H04B 7/0408* (2017.01)
*H04B 7/08* (2006.01)
*H04B 17/336* (2015.01)
*H04L 1/20* (2006.01)
*H04W 24/10* (2009.01)
*H04W 76/15* (2018.01)

(52) U.S. Cl.
CPC ........... *H04B 7/088* (2013.01); *H04B 17/336* (2015.01); *H04L 1/203* (2013.01); *H04W 24/10* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 2019/0268790 A1* | 8/2019 | Kwon | H04W 24/08 |
| 2021/0058134 A1* | 2/2021 | Luo | H04B 7/0695 |
| 2021/0153245 A1 | 5/2021 | Tooher et al. | |
| 2022/0167397 A1* | 5/2022 | Thangarasa | H04W 74/08 |

FOREIGN PATENT DOCUMENTS

WO    WO-2019242853 A1    12/2019

OTHER PUBLICATIONS

International Search Report and Written Opinion—PCT/US2022/027112—ISA/EPO—Aug. 2, 2022.

* cited by examiner

*Primary Examiner* — Scott M Sciacca
(74) *Attorney, Agent, or Firm* — Dalei Dong; Holland & Hart LLP

(57) ABSTRACT

Methods, systems, and devices for wireless communications are described that provide for interference-aware beam failure detection procedures. One or more beam failure parameters may be adjusted based on a likelihood of temporary interference being present for a communications beam. The beam failure parameters may include beam failure indication (BFI) counts or count thresholds that may be adjusted based on a likelihood of BFIs being the result of temporary interference. Additionally or alternatively, one or more measurement thresholds that trigger a BFI may be adjusted based on a likelihood of a presence of temporary interference.

30 Claims, 24 Drawing Sheets

TECHNIQUES FOR INTERFERENCE-BASED BEAM FAILURE DETECTION

FIELD OF TECHNOLOGY

The following relates to wireless communications, including techniques for interference-based beam failure detection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station may transmit one or more beam failure detection (BFD) reference signals (RSs) to a UE as part of a beam failure detection procedure. The UE may measure the one or more BFD RSs and determine whether to declare a beam failure to the base station based on the measurements. In the event of a beam failure declaration, the UE and base station may initiate a beam failure recovery procedure to measure and identify one or more beams for further communications. Such beam failure recovery procedures may result in a relatively high signaling overhead, relatively high power consumption, or a relatively long time before beam failure recovery is performed.

SUMMARY

The described techniques relate to improved methods, systems, devices, and apparatuses that support techniques for interference-based beam failure detection. In various aspects the described techniques provide for interference-aware beam failure detection procedures in which one or more beam failure parameters may be adjusted based on a likelihood of temporary interference being present for a beam. In some cases, one or more beam failure indication (BFI) counts or count thresholds may be adjusted based on a likelihood of BFIs being the result of temporary interference. In some aspects, additionally or alternatively, one or more measurement thresholds that trigger a BFI may be adjusted based on a likelihood of a presence of temporary interference.

A method for wireless communication at a user equipment (UE) is described. The method may include receiving one or more reference signals from a base station on a first beam used for communications between the UE and the base station and transmitting signaling indicating a beam failure based on one or more measurements of the one or more reference signals and at least one beam failure parameter, where the at least one beam failure parameter is adjusted based at least on part on interference associated with the first beam that is measured based on the one or more reference signals.

An apparatus for wireless communication at a UE is described. The apparatus may include a processor, memory coupled with the processor, and instructions stored in the memory. The instructions may be executable by the processor to cause the apparatus to receive one or more reference signals from a base station on a first beam used for communications between the UE and the base station and transmit signaling indicating a beam failure based on one or more measurements of the one or more reference signals and at least one beam failure parameter, where the at least one beam failure parameter is adjusted based at least on part on interference associated with the first beam that is measured based on the one or more reference signals.

Another apparatus for wireless communication at a UE is described. The apparatus may include means for receiving one or more reference signals from a base station on a first beam used for communications between the UE and the base station and means for transmitting signaling indicating a beam failure based on one or more measurements of the one or more reference signals and at least one beam failure parameter, where the at least one beam failure parameter is adjusted based at least on part on interference associated with the first beam that is measured based on the one or more reference signals.

A non-transitory computer-readable medium storing code for wireless communication at a UE is described. The code may include instructions executable by a processor to receive one or more reference signals from a base station on a first beam used for communications between the UE and the base station and transmit signaling indicating a beam failure based on one or more measurements of the one or more reference signals and at least one beam failure parameter, where the at least one beam failure parameter is adjusted based at least on part on interference associated with the first beam that is measured based on the one or more reference signals.

In some examples of the method, apparatuses, and non-transitory computer-readable medium described herein, the at least one beam failure parameter includes a beam failure indication (BFI) that is determined for each of a set of multiple periods in which a first periodic reference signal of the one or more reference signals is measured, and where the method further includes applying a first adjustment to a BFI count when a number of consecutive BFIs is less than a threshold value, and applying a second adjustment to the BFI count when the number of consecutive BFIs is equal to or greater than the threshold value, and where the determining to declare the beam failure is based on an adjusted BFI count. In some examples of the method, apparatuses, and non-transitory computer-readable medium described herein, the first adjustment or the second adjustment to the BFI count is reset to zero when a subsequent period of the set of multiple periods fails to generate a BFI. In some examples of the method, apparatuses, and non-transitory computer-readable medium described herein, the first adjustment of the BFI count triggers a beam failure declaration more slowly than the unadjusted BFI count, and the second adjustment of the BFI count triggers the beam failure declaration more quickly than the unadjusted BFI count. Some examples of the method, apparatuses, and non-transitory computer-readable medium described herein may further include operations, features, means, or instructions for transmitting, to the base station, a beam failure declaration based on the number of consecutive BFIs meeting a maximum consecutive BFI count threshold before an expiration of a beam failure declaration timer.

Some examples of the method, apparatuses, and non-transitory computer-readable medium described herein may further include operations, features, means, or instructions for starting, at a medium access control (MAC) layer of the UE, a beam failure recovery (BFR) timer responsive to a BFI provided by a physical layer of the UE, and initiating, at the MAC layer when a maximum consecutive BFI count threshold is reached, one or more of, a random access procedure irrespective of a status of the BFR timer, a transmission of a request for an aperiodic reference signal from the base station while the BFR timer is unexpired, or a transmission of uplink control information (UCI) to the base station that indicates the beam failure due to interference while the BFR timer is unexpired. Some examples of the method, apparatuses, and non-transitory computer-readable medium described herein may further include operations, features, means, or instructions for receiving, from the base station, configuration information that provides the at least one beam failure parameter and receiving, from the base station in one or more of downlink control information (DCI) or a medium access control (MAC) control element, an indication to enable adjustments of the at least one beam failure parameter.

Some examples of the method, apparatuses, and non-transitory computer-readable medium described herein may further include operations, features, means, or instructions for determining, for each of a set of multiple periods of a first periodic reference signal of the one or more reference signals, whether a BFI is detected, and where the at least one beam failure parameter includes an adaptive maximum BFI count threshold that is used to determine when to declare the beam failure. Some examples of the method, apparatuses, and non-transitory computer-readable medium described herein may further include operations, features, means, or instructions for increasing the adaptive maximum BFI count threshold based at least on part on determining that a BFI is detected for a first number of consecutive periods of the set of multiple periods that is less than a consecutive BFI threshold value and decreasing the adaptive maximum BFI count threshold based on determining that BFI is detected for a second number of consecutive periods of the set of multiple periods that is greater than or equal to the consecutive BFI threshold value.

In some examples of the method, apparatuses, and non-transitory computer-readable medium described herein, the at least one beam failure parameter includes a block error rate (BLER) threshold value that is used to determine whether to provide a BFI, and where the BLER threshold value is adjusted based at least on part on one or more of a measured channel condition associated with the first beam, a service requirement associated with the communications between the UE and the base station, or any combinations thereof. In some examples of the method, apparatuses, and non-transitory computer-readable medium described herein, the BLER threshold value may be increased based on a measured interference of the first beam being equal to or greater than a measurement criteria, and the BLER threshold value may be decreased based on the measured interference of the first beam being less than the measurement criteria.

In some examples of the method, apparatuses, and non-transitory computer-readable medium described herein, the BLER threshold value may be adjusted based on multiple configured interference measurement ranges, multiple configured service requirements, an algorithm to calculate the BLER threshold value, or any combinations thereof. In some examples of the method, apparatuses, and non-transitory computer-readable medium described herein, the service requirement includes a quality of service (QoS) target for one or more of a packet error rate, an average latency, an average data rate, or any combinations thereof. In some examples of the method, apparatuses, and non-transitory computer-readable medium described herein, the BLER threshold value may be adjusted at the UE based on measured channel conditions or service requirements, or may be adjusted based on signaling from the base station that indicates an adjustment to the BLER threshold value. Some examples of the method, apparatuses, and non-transitory computer-readable medium described herein may further include operations, features, means, or instructions for receiving configuration information from the base station that indicates a set of multiple different BLER threshold values, one or more adaptive BLER threshold calculation algorithms, or any combinations thereof and adjusting the BLER threshold value based on the configuration information, downlink signaling in a MAC control element or DCI, or any combinations thereof.

A method for wireless communication at a base station is described. The method may include configuring a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters, transmitting one or more reference signals to the UE on the first beam, where the one or more beam failure parameters are based on measurements of the one or more reference signals, receiving signaling from the UE indicating a beam failure, and initiating a beam failure recovery in response to the signaling received from the UE.

An apparatus for wireless communication at a base station is described. The apparatus may include a processor, memory coupled with the processor, and instructions stored in the memory. The instructions may be executable by the processor to cause the apparatus to configure a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters, transmit one or more reference signals to the UE on the first beam, where the one or more beam failure parameters are based on measurements of the one or more reference signals, receive signaling from the UE indicating a beam failure, and initiate a beam failure recovery in response to the signaling received from the UE.

Another apparatus for wireless communication at a base station is described. The apparatus may include means for configuring a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters, means for transmitting one or more reference signals to the UE on the first beam, where the one or more beam failure parameters are based on measurements of the one or more reference signals, means for receiving signaling from the UE indicating a beam failure, and means for initiating a beam failure recovery in response to the signaling received from the UE.

A non-transitory computer-readable medium storing code for wireless communication at a base station is described. The code may include instructions executable by a processor to configure a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters, transmit one or more reference signals to the UE on the first beam, where the one or more beam failure parameters are based on measurements of the one or more reference signals, receive signaling from the UE indicating a beam failure, and initiate a beam failure recovery in response to the signaling received from the UE.

In some examples of the method, apparatuses, and non-transitory computer-readable medium described herein, the one or more beam failure parameters include a BFI that is determined for each of a set of multiple periods in which a first periodic reference signal of the one or more reference signals is measured, and where the method further includes and configuring a first adjustment to a BFI count when a number of consecutive BFIs is less than a threshold value, and a second adjustment to the BFI count when the number of consecutive BFIs is equal to or greater than the threshold value, and where the beam failure declaration is based on an adjusted BFI count.

Some examples of the method, apparatuses, and non-transitory computer-readable medium described herein may further include operations, features, means, or instructions for configuring the UE to transmit the beam failure declaration based on the number of consecutive BFIs meeting a maximum consecutive BFI count threshold before an expiration of a beam failure declaration timer. Some examples of the method, and non-transitory computer-readable medium described herein may further include operations, features, means, or instructions for transmitting, to the UE, in one or more of DCI or a MAC control element, an indication to enable adjustments of the one or more beam failure parameters. In some examples of the method, apparatuses, and non-transitory computer-readable medium described herein, the configuring may include operations, features, means, or instructions for configuring an adaptive maximum BFI count threshold for determining when to declare the beam failure, where the adaptive maximum BFI count threshold is increased based at least on part on determining that a BFI is detected for a first number of consecutive periods of the set of multiple periods that is less than a consecutive BFI threshold value, or the adaptive maximum BFI count threshold is decreased based on determining that BFI is detected for a second number of consecutive periods of the set of multiple periods that is greater than or equal to the consecutive BFI threshold value.

In some examples of the method, apparatuses, and non-transitory computer-readable medium described herein, the one or more beam failure parameters include a BLER threshold value that is used to determine a BFI, and where the BLER threshold value is configured to be adjusted based at least on part on one or more of a measured channel condition associated with the first beam, a service requirement associated with the communications between the UE and the base station, or any combinations thereof. In some examples of the method, apparatuses, and non-transitory computer-readable medium described herein, the BLER threshold value may be increased based on a measured interference of the first beam being equal to or greater than a measurement criteria, and the BLER threshold value may be decreased based on the measured interference of the first beam being less than the measurement criteria. In some examples of the method, apparatuses, and non-transitory computer-readable medium described herein, the configuring may include operations, features, means, or instructions for configuring a set of multiple channel condition measurement ranges that are each associated with a different BLER threshold value, configuring a set of multiple service requirements that are each associated with different BLER threshold values, configuring an algorithm to calculate the BLER threshold value, or any combinations thereof. Some examples of the method, apparatuses, and non-transitory computer-readable medium described herein may further include operations, features, means, or instructions for transmitting, to the UE, signaling to indicate an adjustment to the BLER threshold value.

DETAILED DESCRIPTION

Figure 1:
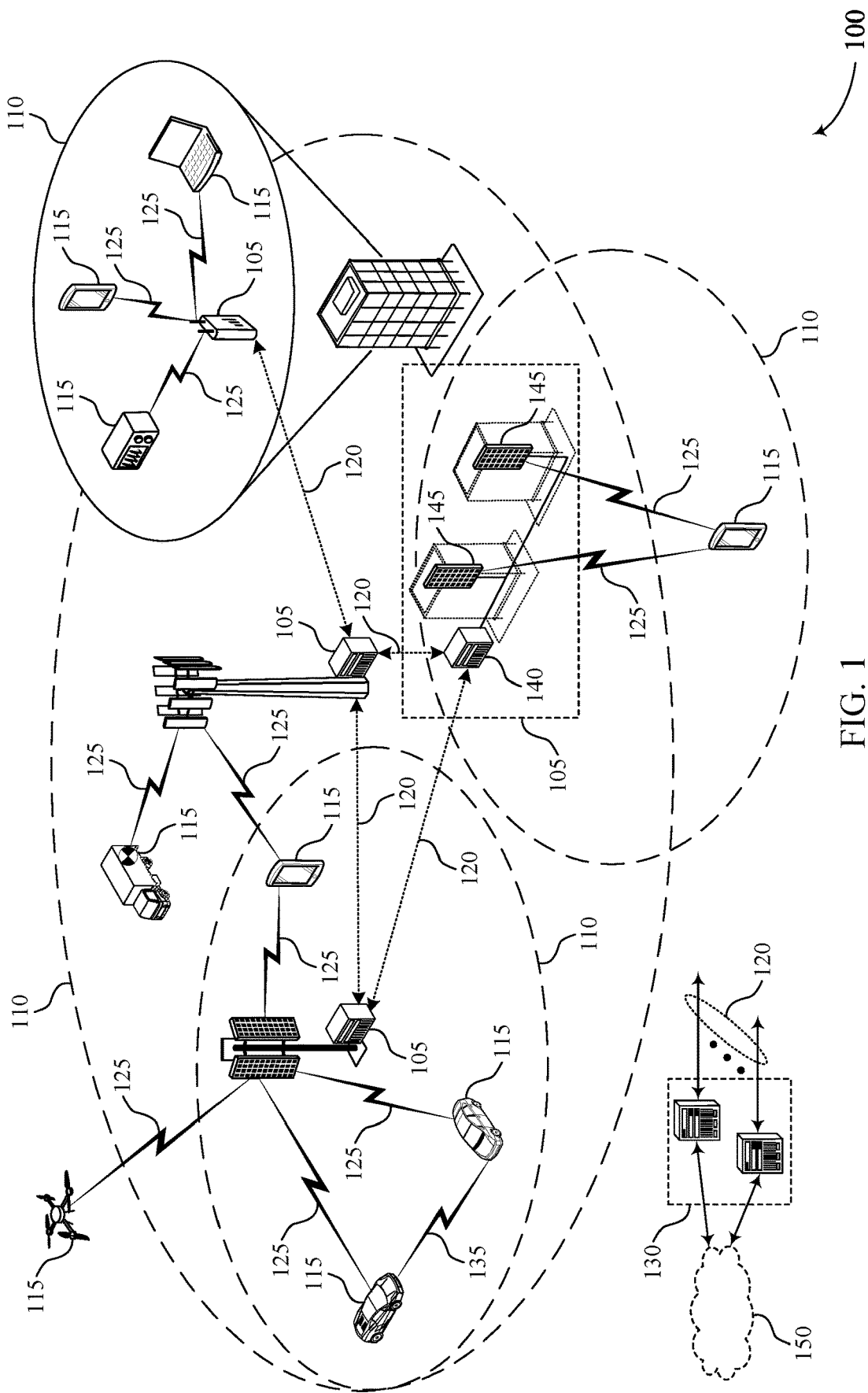
FIG. 1 illustrates an example of a wireless communications system that supports techniques for interference-based beam failure detection in accordance with aspects of the present disclosure.

A wireless communications system may include various communication devices such as a user equipment (UE) and a base station, which may provide wireless communication services to the UE. For example, such a base station may be a next-generation NodeB (referred to as a gNB) that may support multiple radio access technologies including, for example, fourth generation (4G) systems, such as 4G Long Term Evolution (LTE), and fifth generation (5G) systems, which may be referred to as 5G New Radio (NR).

In some cases, a UE and a base station may communicate using beamforming techniques. For example, the UE and the base station may transmit and receive information on one or more beams. In some cases, the UE may experience one or more beam failures. For example, if the UE and the base station communicate using a beam, the beam may experience signal attenuation (e.g., path loss, penetration loss, blockage loss), which may be influenced by various factors, such as diffraction, propagation environment, density of blockages, material properties, etc. In some cases, channel conditions for the communications may fail to satisfy a threshold due to such signal attenuation. For example, a blockage or other factors may degrade channel conditions and result in a beam failure. In such examples, the UE may be unable to successfully receive or decode communications associated with the beam, which may reduce communications quality, increase latency, and result in a relatively poor user experience.

In some cases, to detect beam failure, the base station may transmit one or more beam failure detection (BFD) reference signals (RSs) to the UE, which the UE may use to determine whether beam failure is present. As an example, the UE may determine beam failure by measuring the signal to interference plus noise ratio (SINR) of each BFD-RS. Upon measuring the SINR, the UE may estimate the block error rate (BLER) of each BFD-RS. The UE may compare the measured BLER to a threshold BLER. If the measured BLER is greater than the threshold, the UE may record a beam failure. That is, the UE may record a beam failure instance, a beam failure indication (BFI), or the like. The UE, upon a first instance of a BFI, may start a beam failure recovery (BFR) timer and if a predetermined number of BFIs are recorded before expiration of the BFR timer (or within a rolling time window) the UE may declare a beam failure that initiates a BFR procedure between the UE and the base station.

In beamformed communications that use relatively narrow beams, such as in NR systems operating in frequency range 2 (FR2) or FR2x, transient interference may occur when beams are temporarily blocked. In many cases, the interference subsides relatively quickly and communications using the beam may be maintained. For example, a beam may be blocked due to a moving object that temporarily obstructs a line-of-sight between the UE and base station, but the beam may be unobstructed again once the object moves away. In the presence of unexpected beam blocking that subsides relatively quickly, BFR procedures may be triggered if BFR criteria are met, even though the channel between the base station and UE is relatively good.

In accordance with various aspects discussed herein, techniques for interference-aware BFD may reduce a number of instances where a BFR procedure is initiated due to temporary interference. In some cases, adjustments to BFI counts or a BFI maximum count threshold may be used to trigger a beam failure declaration that is transmitted to the base station. In some cases, BFI counts are adjusted based on a number of consecutive BFIs that are identified. For example two or more consecutive BFI that are detected without other non-consecutive BFIs may be indicative of temporary interference rather than a bad channel. In some cases, BFI counts may be adjusted to increment counts more slowly if a number of consecutive counts is less than a consecutive BFI threshold, and then increment counts more quickly when the consecutive BFI threshold is met. In other cases, a maximum count parameter for triggering a beam failure declaration may be adjusted based on a number of consecutive BFIs. In further cases, adjustments for indicating a BFI may be made at the PHY layer, where a BLER threshold for generating a BFI is adjusted based on channel conditions, service parameters (e.g., QoS and/or latency parameters), or combinations thereof.

Such BFR parameter adjustments may allow for reduced declarations of beam failure by a UE in cases where transient interference or blocking may temporarily interfere with a beam. Such techniques may thus reduce overhead burden and performance reductions from extra beam failure declarations, and may reduce power consumption associated with extra BFR procedures. Further, techniques as discussed herein may enhance network efficiency and reduce latency through reduced beam training procedures relative to cases where beam failure is declared based on temporary interference rather than poor channel conditions.

Aspects of the disclosure are initially described in the context of wireless communications systems. Aspects of the disclosure are further illustrated by and described with reference to examples of adjusted beam failure parameters, apparatus diagrams, system diagrams, and flowcharts that relate to techniques for interference-based beam failure detection.

FIG. 1 illustrates an example of a wireless communications system 100 that supports techniques for interference-based beam failure detection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, communications between base stations 105 and UEs 115 may use beamformed transmissions, and a base station 105 may transmit BFD RSs that may be measured at the UE 115 as part of a BFD procedure. In some cases, UEs 115 may use interference-aware BFD techniques in which one or more beam failure parameters may be adjusted based on a likelihood of interference being present for a beam. In some cases, one or more BFI counts or BFI count thresholds may be adjusted based on a likelihood of BFIs being the result of interference rather than a poor channel condition. In some cases, additionally or alternatively, one or more measurement thresholds, such as a BLER threshold value, that trigger a BFI may be adjusted based on a likelihood of a presence of interference.

Figure 2:
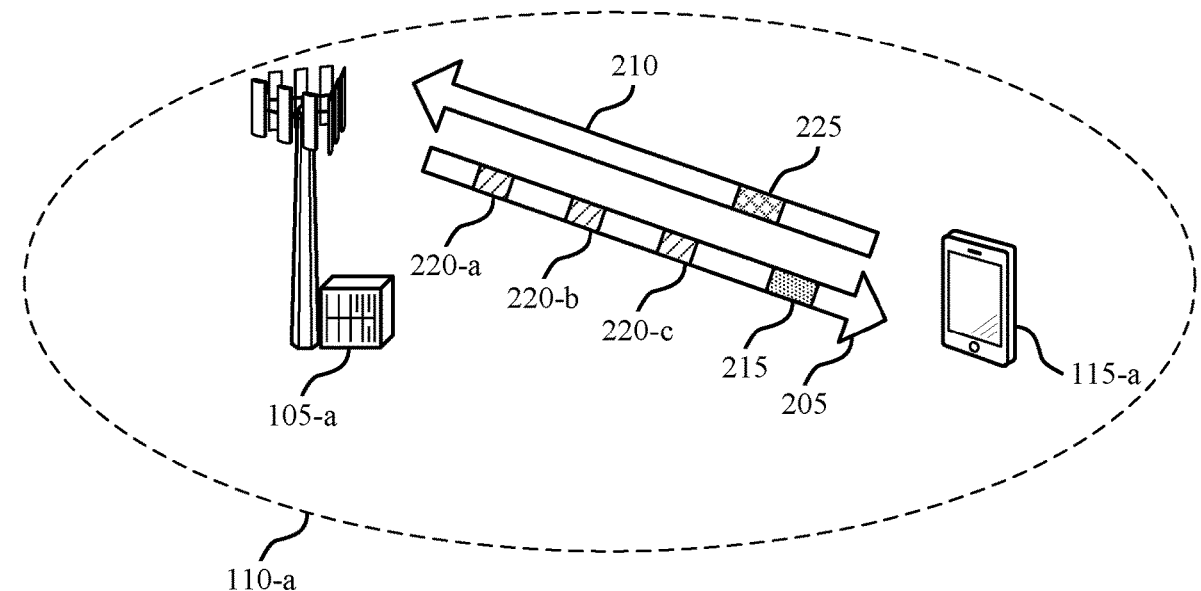
FIG. 2 illustrates an example of a portion of a wireless communications system that supports techniques for interference-based beam failure detection in accordance with aspects of the present disclosure.

FIG. 2 illustrates an example of a wireless communications system 200 that supports techniques for interference-based beam failure detection in accordance with aspects of the present disclosure. In some examples, the wireless communications system 200 may implement aspects of the wireless communications system 100 of FIG. 1. For example, the wireless communications system 200 may include a base station 105-a which may be an example of base stations 105 of FIG. 1. Additionally, the wireless communications system 200 may include a UE 115-a which may be an example of UEs 115 of FIG. 1.

In some cases, the UE 115-a may be in a coverage area 110-a which may be associated with the base station 105-a. The base station 105-a may communicate with the UE 115-a on a downlink communication link 205 and on an uplink communication link 210. In some cases, the UE 115-a and the base station 105-a may communicate using beams to facilitate satisfactory data transmission performance. For example, the UE 115-a and the base station 105-a may communicate using beamforming techniques as described herein with reference to FIG. 1. For example, the communication links 205 and 210 may be examples of beams, where downlink communication link 205 and uplink communication link 210 may be separate beams or the same beam. In some cases, the UE 115-a may experience one or more beam failures. For example, if the UE 115-a and the base station 105-a communicate using a beam, the beam may experience signal attenuation (e.g., path loss, penetration loss, blockage loss), which may be influenced by various factors, such as diffraction, propagation environment, density of blockages, material properties, and the like. In some cases, channel conditions for the communications may fail to satisfy a threshold due to such signal attenuation. For example, a blockage or other factors may degrade channel conditions and result in a beam failure. In such examples, the UE 115-a may be unable to successfully receive or decode communications associated with the beam, which may reduce communications quality, increase latency, and result in a relatively poor user experience.

In some cases, BFD procedures may be implemented by the base station 105-a and UE 115-a. The base station 105-a may transmit configuration information 215 to the UE 115-a, which may indicate resources for one or more reference signals 220 (e.g., BFD RSs). In some cases, periodic reference signals 220 may be configured, with a first instance of the reference signal 220-a, a second instance of the reference signal 220-b, and a third instance of the reference signal 220-c illustrated in FIG. 2. In some cases, aperiodic BFD RSs may be transmitted in addition to (or alternatively to) periodic reference signals 220. The UE 115-a may measure the reference signals 220 and determine whether the measurement triggers a BFI (e.g., if a BLER of the BFD RS exceeds a BLER threshold value, as measured at the physical layer, the physical layer may report a BFI to the MAC layer). The UE 115-a, when a first BFI is triggered, may start a BFR timer, and BFI counts increase by one whenever BFI is reported from the physical layer to the MAC layer. If the BFI count reaches a threshold value (e.g., a maxCount value) before the BFR timer expires, the UE 115-a may declare a beam failure and transmit a beam failure declaration 225. A beam failure recovery is then initiated at the base station 105-a and the UE 115-a.

In accordance with some aspects of the present disclosure, the beam failure declaration 225 may be determined based on a pattern of BFIs that are reported from the physical layer at the UE 115-a. In some cases, the pattern of BFIs may be used to distinguish BFIs that are more likely to be due to temporary interference from BFIs that are more likely to be due to poor channel conditions. In some cases, in the event that a relatively small number of multiple consecutive BFIs are reported from the physical layer from consecutive instances of the reference signals 220, such BFIs may be more likely related to temporary interference, while non-consecutive BFIs or a relatively large number of consecutive BFIs might be more likely related to poor channel conditions. For example, if channel conditions are otherwise acceptable and the channel has not experienced other BFIs recently, a series of relatively few (e.g., three or four) consecutive BFIs may be indicative of a temporary blockage, whereas a larger number of consecutive BFIs (e.g., five or six, depending upon the periodicity of the reference signals 220) may be indicative of a more severe channel attenuation. In some cases, when it is more likely that multiple BFIs are due to interference, the beam failure declaration 225 may be delayed relative to instances where multiple BFIs are more likely due to poor channel conditions.

In some cases, the UE 115-a may use dynamic BFI counting, in which a BFI count value may be adjusted based on a pattern of BFIs. In some cases, a function may be defined, such as y=ƒ(BFI_count), wherein y increases slowly with BFI counts when the BFI count is relatively small, and increases quickly (e.g., exponentially) for each additional BFI count when a BFI count is relatively large. Examples of such dynamic counting are discussed in more detail with reference to FIG. 4. Such dynamic BFI counting may provide that instances where relatively few consecutive BFIs are reported, which may be indicative of temporary interference, the UE 115-a may not transmit the beam failure declaration 225, which may allow the UE 115-a and base station 105-a to avoid a beam failure recovery procedure based on temporary interference and continue communications using the established beam.

In some cases, the UE 115-a may use an adaptive maximum count threshold for determining whether to transmit the beam failure declaration 225. In such cases, a maximum count threshold may be adjusted to be increased when a number of consecutive BFIs is relatively low, and to be decreased when the number of consecutive BFIs becomes relatively large. Examples of such adaptive maximum count thresholds are discussed in more detail with reference to FIG. 5. Such adaptive maximum count threshold techniques may provide that instances where relatively few consecutive BFIs are reported, which may be indicative of temporary interference, the UE 115-a may not transmit the beam failure declaration 225, which may allow the UE 115-a and base station 105-a to avoid a beam failure recovery procedure based on temporary interference and continue communications using the established beam.

Additionally or alternatively, the UE 115-a may implement a flexible BLER threshold value for reporting a BFI. As discussed herein, a beam failure may be first characterized by BFI based on SINR measurements of one or more BFD-RSs, which may be used to determine an estimated BLER. Such estimates may be performed at the physical layer of the UE 115-a, and in the event that the estimated BLER is greater than a BLER threshold value (e.g., 10% BLER), a BFI may be reported to the MAC layer of the UE 115-a. In some cases, the BLER threshold value may be adjusted based on estimated channel conditions, where channel conditions that may be more likely due to temporary interference (e.g., if estimated BLER is 30% or 40% due to beam blockage) may use a higher BLER threshold value and channel conditions that may be more likely due to poor channel conditions (e.g., if estimated BLER is 10% or 12% due to poor channel conditions). In some cases, the UE 115-*a* may be configured with multiple BLER threshold values, may be configured with an algorithm to calculate BLER threshold values, or combinations thereof. The UE 115-*a* may then determine different BLER threshold values based on one or more of current channel conditions, a service requirement, or combinations thereof. In some cases, the configuration information 215 may provide information for BLER threshold values.

In some cases, channel conditions may be more indicative of temporary interference, and when interference is high and channel conditions are relatively good, the BLER threshold value may be changed to be a larger value. The larger BLER threshold value may reduce the impact of the temporary interference by reducing a number of BFI declarations. In some cases, the UE 115-*a* may use one or more prior channel condition measurements or BLER estimates to determine a current BLER threshold value. For example, the UE 115-*a* may use machine learning techniques to identify the BLER threshold value based on previous BLER estimates or BLER threshold values that are stored at the UE 115-*a*. Additionally or alternatively, a quality of service (QoS) target associated with communications between the UE 115-*a* and base station 105-*a* may be used to determine a BLER threshold value. For example, a packet error rate target may be provided as part of a QoS configuration, and when the target error rate is low the BLER threshold value may be reduced, and if the target error rate is relatively high the BLER threshold value may be increased. Further, in some cases, the QoS configuration may include a target latency value, and relatively low latency targets may have a relatively low BLER threshold value and higher latency targets may have higher BLER threshold values. Additionally, the QoS configuration may include a target data rate, where lower target data rates may have higher BLER threshold values and higher data rates may have lower BLER threshold values. Various aspects may use any different combinations of QoS parameters to determine a BLER threshold value.

In some cases, the UE 115-*a* may determine interference, channel quality, previous BLER estimates, traffic QoS requirement, or any combinations thereof, and if a BLER threshold value change condition is satisfied, the UE may change the BLER threshold value. In other cases, the base station 105-*a* may measure channel quality and store previous channel condition reports, and may identify traffic QoS targets. Based on the measured channel quality, previous channel condition reports, QoS targets, or combinations thereof, the base station 105-*a* may determine if a BLER threshold value change condition is satisfied, and may transmit an indication to the UE 115-*a* change the BLER threshold value (e.g., in downlink signaling to the UE 115-*a* such as a MAC control element (CE) or downlink control information (DCI)). In some cases, the configuration information 215 (e.g., transmitted in RRC signaling) may include information for multiple BLER threshold values, may be configured with multiple different sets of BLER threshold values, may include configuration for one or more adaptive BLER threshold calculation algorithms, or combinations thereof. In cases where the UE 115-*a* is configured with multiple BLER threshold values, or multiple sets of BLER threshold values, the base station 105-*a* may signal which BLER threshold value or set of BLER threshold values is to be used (e.g., in a MAC-CE or in DCI). Similarly, the UE 115-*a* may also be configured by RRC with multiple calcu-lation algorithms for adaptive BLER thresholds, and a particular algorithm may be signaled to the UE 115-*a* (e.g., in a MAC CE or in DCI).

Figure 3:
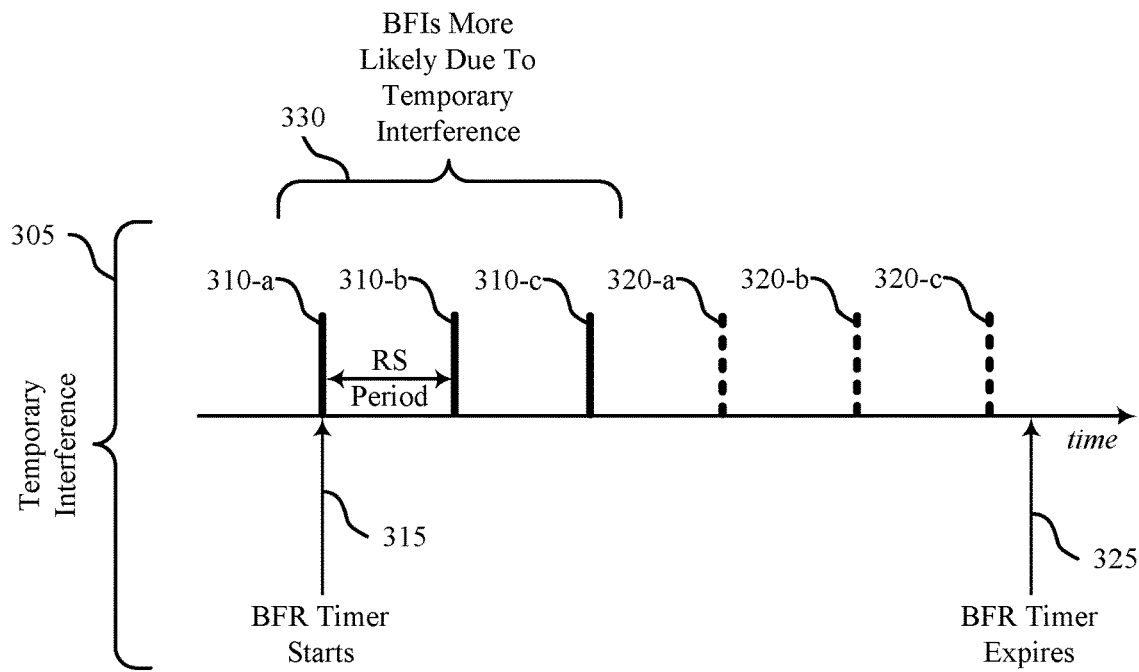
FIG. 3 illustrates examples of beam failure indications for temporary interference or for poor channel conditions that support techniques for interference-based beam failure detection in accordance with aspects of the present disclosure.
Figure 3:
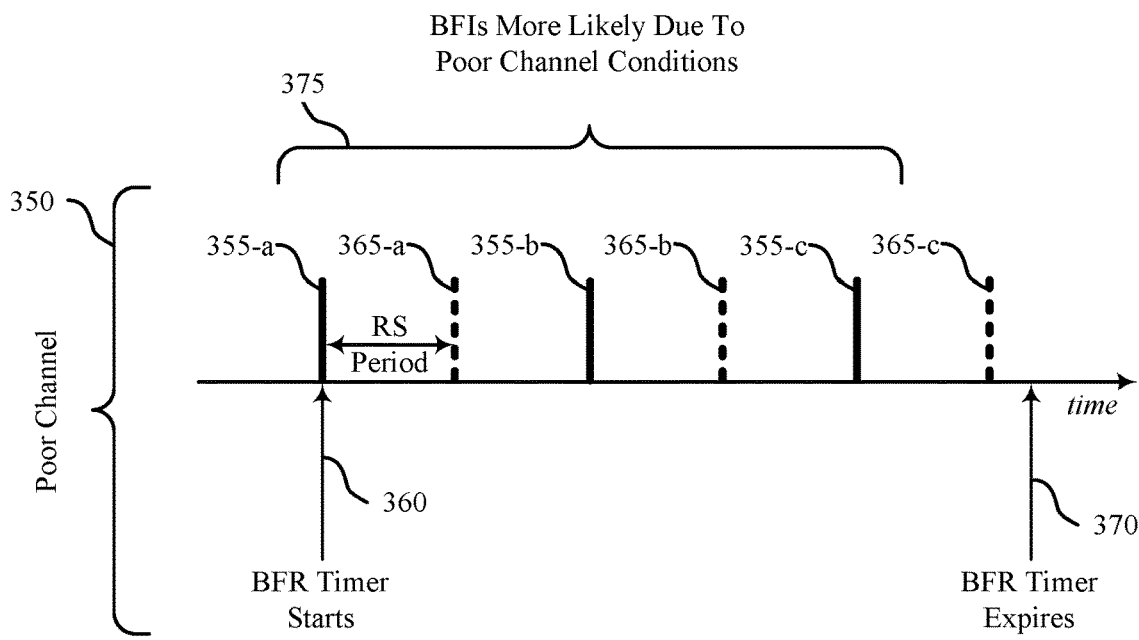

FIG. 3 illustrates examples of beam failure indications for temporary interference or for poor channel conditions 300 that supports techniques for interference-based beam failure detection in accordance with aspects of the present disclosure. In some examples, beam failure declarations by UEs in aspects of wireless communications systems 100 or 200 may be based on BFI patterns such as illustrated in FIG. 3. In the examples of FIG. 3, periodic BFD-RSs may be transmitted, having a reference signal period. For each BFD-RS, the UE may determine whether a BFI is triggered or not. For example, the UE may measure a SINR of each BFD-RS. Based on measuring the SINR, the UE may estimate a BLER corresponding to the SINR of each RS. The UE may compare the estimated BLER to a threshold BLER. If the estimated BLER is greater than or equal to the threshold BLER, the UE may record a beam failure instance. If the BLER exceeds or matches the BLER threshold, the UE may record a BFI for the RS. In some examples, beam failure is determined at the physical layer (e.g., L1 or layer 2 (L2)). The base station may transmit the BFD-RSs as (or within) a synchronization signal block (SSB), a channel state information (CSI) reference signal (RS), or the like.

In a first example 305, temporary interference may be present at a beam. In such a case, a first BFI 310-*a* may be detected at the physical layer and indicated to the MAC layer. The MAC layer may start a BFR timer at time 315 based on the first BFI 310-*a*. In this example, a second BFI 310-*b* and a third BFI 310-*c* may also be generated for the next two consecutive instances of the BFD-RS, but subsequent measurements may indicate no BFI, as indicated at 320-*a*, 320-*b*, and 320-*c*. The BFR timer may expire at time 325. In this first example 305, the consecutive pattern 330 of the multiple consecutive BFIs 310 followed by no BFIs 320 may mean it is more likely that the BFIs 310 were due to temporary interference rather than poor channel conditions. In a second example 350, relatively poor channel conditions may be present at a beam, and the UE may generate BFIs 355 that are non-consecutive with one or more instances of the BDF-RS that have no BFI 365. In this example, at the first instance of BFI 355-*a*, the UE may start BFR timer at time 360, which may expire at time 365. In this second example 350, the non-consecutive pattern 375 of BFIs 355 may mean it is more likely that the BFIs 310 were due to poor channel conditions rather than temporary interference.

Figure 4:
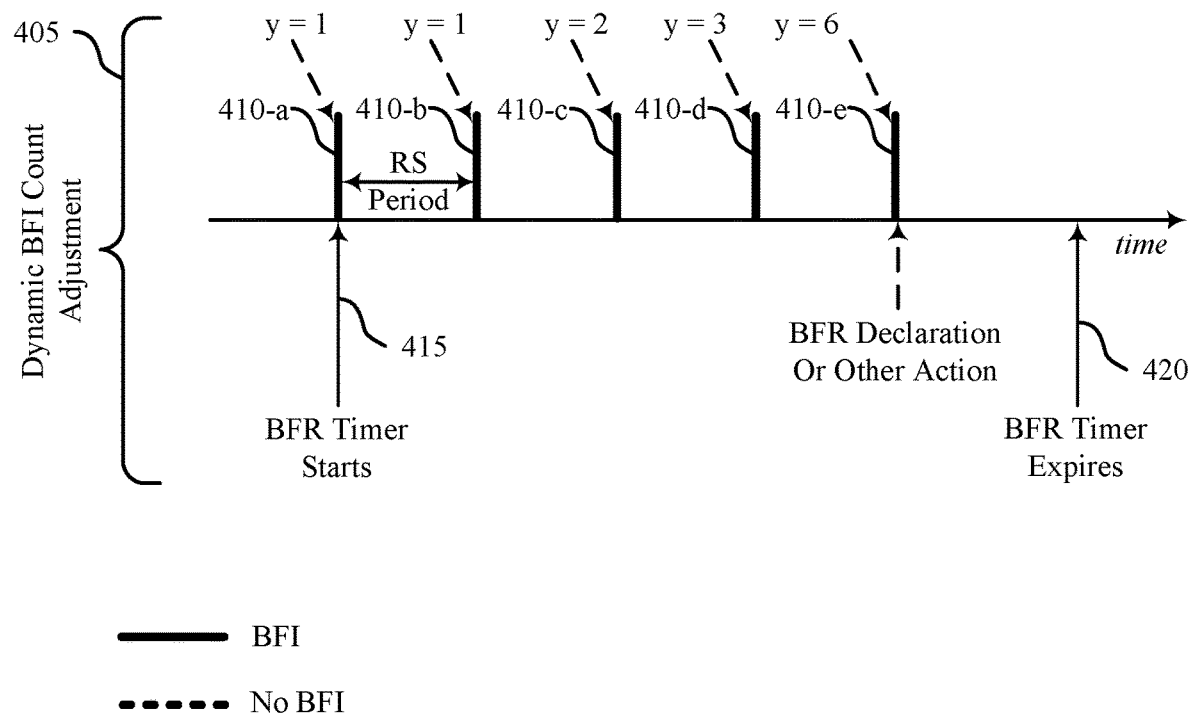
FIG. 4 illustrates an example of dynamic beam failure indication count adjustments that supports techniques for interference-based beam failure detection in accordance with aspects of the present disclosure.
Figure 5:
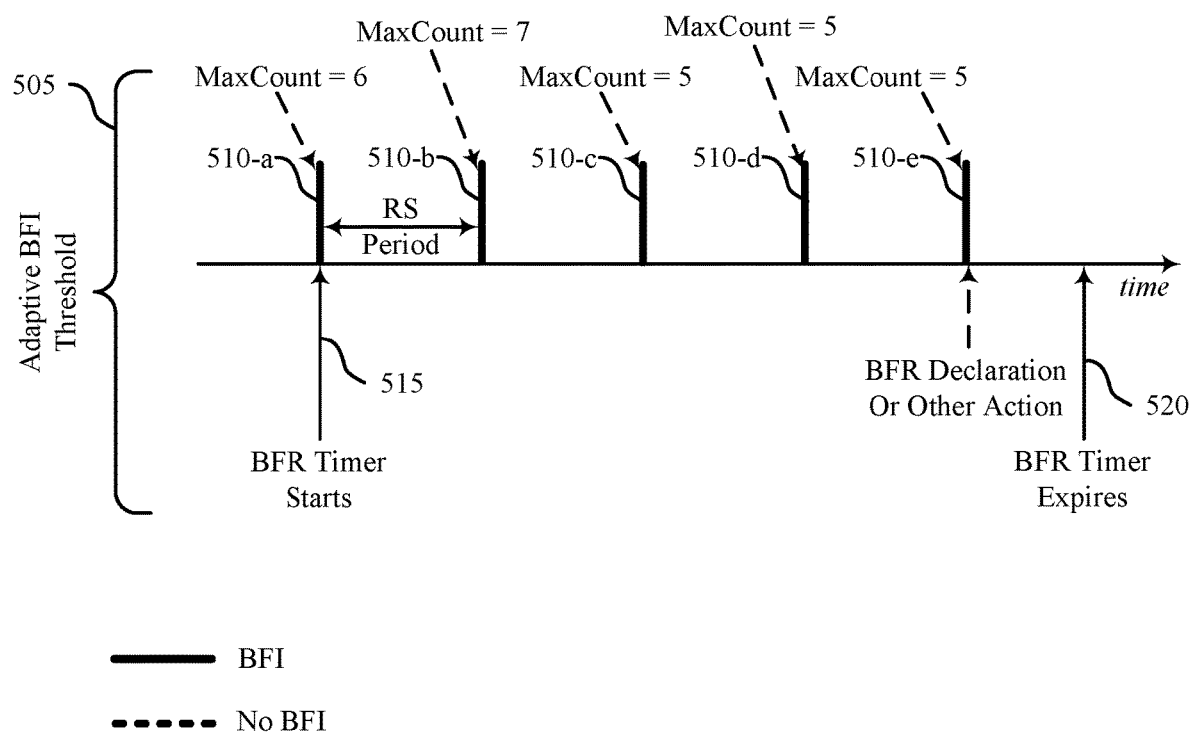
FIG. 5 illustrates an example of adaptive maximum count thresholds that support techniques for interference-based beam failure detection in accordance with aspects of the present disclosure.

In the event that the UE is configured with a maximum count threshold of three and beam failure parameters are not adjusted, each of the first example and the second example such a situation would result in the UE declaring a beam failure, and in the first example 305 such a beam failure declaration may result in an unnecessary re-establishment of a new beam for communications between the UE and base station. In various aspects as discussed herein, dynamic BFI counting or adaptive maximum count threshold may help to avoid such unnecessary beam failure declarations. FIGS. 4 and 5 show examples of such techniques.

FIG. 4 illustrates an example of a dynamic beam failure indication count adjustment 400 that supports techniques for interference-based beam failure detection in accordance with aspects of the present disclosure. In some examples, beam failure declarations by UEs in aspects of wireless communications systems 100 or 200 may be based on BFI patterns such as illustrated in FIG. 4.

In this example, the base station may transmit a periodic reference signal (e.g., a periodic BFD-RS), and the UE may measure each instance of the reference signal to determine whether to generate a BFI 410. In this example, a first instance of a BFI 410-a may be reported by the physical layer, which may trigger a BFR timer start 415. The BFR timer may run according to a configured time duration until a BFR timer expiration 420 in this example. In this example, a maximum count threshold may be configured with a value of six, such that if fewer than six BFIs 410 are reported while the BFR timer is running the UE does not declare a beam failure and if six or more BFIs are reported while the BFR timer is running the UE will declare a beam failure. While a BFR timer is shown in various examples discussed herein, other techniques for beam failure declaration may be used in other examples, such as a rolling time window or moving average BFI count for a configured number of BDS-RS instances, and techniques discussed herein may be used in such other examples as well.

In this example, dynamic BFI count adjustments 405 may be implemented at the UE, where a pattern of BFIs 410 may be used to adjust a count of BFIs 410. For example, a function may be defined based on the BFI count, such as y=f(BFI_count), where y increases slowly while the BFI count is relatively small and increases more quickly (e.g., exponentially) when the BFI count is relatively large. For example, a function may be defined as:

$$y = \begin{cases} a * BFI_{count} & \text{when } BFI_{Count} < \text{threshold\_consecutive} \\ BFI\_count^b & \text{when } BFI_{count} \geq \text{threshold\_consecutive} \end{cases}$$

where a and b are constant, 0<a<1, and b>1, and where threshold_consecutive may be a configured value of consecutive BFIs 410 at the UE. In such cases, the BFI count may be increased more slowly at low BFI counts, and may increase more quickly at higher BFI counts. Further, when non-consecutive BFI is reported, BFI counts is added by y. After that, y is reset to zero and changes again when consecutive BFIs 410 are reported again. In such a manner, when BFI_count is small, consecutive BFIs 410 might represent temporary interference, but a large number of consecutive BFIs 410 might represent a bad channel, and more prompt declaration of beam failure may be beneficial to establish a more reliable beam.

In another example, the function may be defined based on a configured maximum count threshold for BFIs 410 to trigger a declaration of beam failure. For example:

$$y = \left\lfloor \frac{1}{1 - \frac{BFI\_count}{maxCount}} \right\rfloor$$

where maxCount is the configured maximum count threshold, and $\lfloor \cdot \rfloor$ denotes the operation of rounding down a number to the nearest integer. The value of y, similarly as in the prior example, may be reset to zero in the event that a non-consecutive BFI 410 is reported. Using such a function in the example of FIG. 4 with five consecutive BFIs 410 with a maximum count threshold of six (6), a first BFI 410-a and a second BFI 410-b may each have a value of y=1, a third consecutive BFI 410-c may have a value of y=2, a fourth consecutive BFI 410-d may have a value of y=3, and a fifth consecutive BFI 410-e may have a value of y=6. Thus, in such an example, using the dynamic BFI count adjustment, the UE may declare a beam failure or take some other action at the fifth consecutive BFI 410-e, which is prior to the BFR timer expiration 420, and prior to the transmission of a beam failure declaration that would be transmitted based on using an unadjusted BFI count.

Additionally or alternatively, the UE may be configured with a maximum consecutive BFI count (e.g., Max_consecutive_count), and may take action when a triggering condition is detected that corresponds to consecutive BFIs 410 that meet or exceed the maximum consecutive BFI count. In some cases, the additional action may include, for example, the MAC layer directly initiating a random access channel (RACH) procedure even though the BFR timer has not expired, the MAC layer sending an aperiodic BFD-RS request if the BFR timer has not expired, or the MAC layer sending uplink control information (UCI) to a serving base station that indicates a beam failure due to interference if the BFR timer has not expired.

In some cases, the UE may be configured with parameters associated with dynamic BFI counts, such as a dynamic counting function and associated parameters (e.g., a, b, threshold_consecutive), a maximum consecutive BFI count threshold (e.g., Max_consecutive_count), or combinations thereof. Further, in some cases, a set of multiple values of such parameters may be configured. The configuration may be via RRC configuration (e.g., L3 signaling), a MAC-CE, DCI, or combinations thereof. In some cases, if multiple of values of the parameter are available, the base station may use DCI or a MAC CE (e.g., L1/L2 signaling) to indicate a switch of value.

FIG. 5 illustrates an example of adaptive maximum count thresholds 500 that supports techniques for interference-based beam failure detection in accordance with aspects of the present disclosure. In some examples, beam failure declarations by UEs in aspects of wireless communications systems 100 or 200 may be based on BFI patterns such as illustrated in FIG. 5.

In this example, the base station may transmit a periodic reference signal (e.g., a periodic BFD-RS), and the UE may measure each instance of the reference signal to determine whether to generate a BFI 510. In this example, a first instance of a BFI 510-a may be reported by the physical layer, which may trigger a BFR timer start 515. The BFR timer may run according to a configured time duration until a BFR timer expiration 520 in this example. In this example, a maximum count threshold may be configured with a value of six, such that if fewer than six BFIs 510 are reported while the BFR timer is running the UE does not declare a beam failure and if six or more BFIs 510 are reported while the BFR timer is running the UE will declare a beam failure.

In this example, adaptive maximum BFI count thresholds 505 may be implemented at the UE, where a maximum BFI count threshold (e.g., maxCount) may be based at least in part on a number of consecutive BFIs 510 (e.g., consecutive BFI_count). In some cases, if a current maxCount=C, a function may be defined such that maxCount=f(consecutive BFI_count), where maxCount is greater than C when consecutive BFI_count is relatively small, and maxCount is less than C when consecutive BFI_count is relatively large. For example, the maximum BFI count threshold may be determined based on:

$$maxCount = \begin{cases} C + a & \text{if consecutive BFI\_count} < \text{threshold\_consecutive} \\ C - b & \text{if consecutive BFI\_count} \geq \text{threshold\_consecutive} \end{cases}$$

where a and b are each greater than zero, and threshold_consecutive is a configured value for a threshold number of consecutive BFIs 510. In such cases, when non-consecutive BFIs 510 are reported, the current maxCount is set to be the configured (i.e., unadjusted) maxCount, which is then adjusted in the event of multiple consecutive BFIs 510. This example thus provides that when consecutive BFIs 510 are relatively small it is more likely to represent temporary interference, and the maximum BFI count threshold value may be increased in order to reduce the impact of interference BFIs 510 by increasing the maxCount threshold. However, a large number of consecutive BFI report might represent poor channel conditions, which may need to be addressed more promptly by decreasing the maxCount threshold.

In the example illustrated in FIG. 5, the threshold of consecutive BFIs 510 may be set to three (3) and a and b may each be one (1), with a maxCount threshold of six (6). Thus, in this case, using the function as described above, a first BFI 510-*a* triggers the BFR timer start 515 and has an associated maxCount threshold of 6. A second BFI 510-*b* may have an associated maxCount threshold of 7 (i.e., 6+1, since BFI_count<3), a third BFI 510-*c* may have an associated maxCount threshold of 5 (i.e., 6−1 since BFI_count≥3), and a fourth BFI 510-*d* and fifth BFI 510-*e* may each have an associated maxCount threshold of 5 (i.e., 6−1 since BFI_count≥3). Thus, in such an example, using the adaptive maximum BFI count thresholds, the UE may declare a beam failure or take some other action at the fifth consecutive BFI 510-*e*, which is prior to the BFR timer expiration 520, and prior to the transmission of a beam failure declaration that would be transmitted based on using an unadjusted maximum BFI count threshold.

In some cases, the UE may be configured with parameters associated with adaptive maximum BFI count thresholds, such as an adaptive threshold function (*f*) and associated parameters (e.g., a, b, threshold_consecutive), a maximum consecutive BFI count threshold (e.g., Max_consecutive_count) in cases where actions are taken based on such a threshold (e.g., similarly as discussed with reference to FIG. 4), or combinations thereof. Further, in some cases, a set of multiple values of such parameters may be configured. The configuration may be via RRC configuration (e.g., L3 signaling), a MAC-CE, DCI, or combinations thereof. In some cases, if multiple of values of the parameter are available, the base station may use DCI or a MAC CE (e.g., L1/L2 signaling) to indicate a switch of value.

Figure 6:
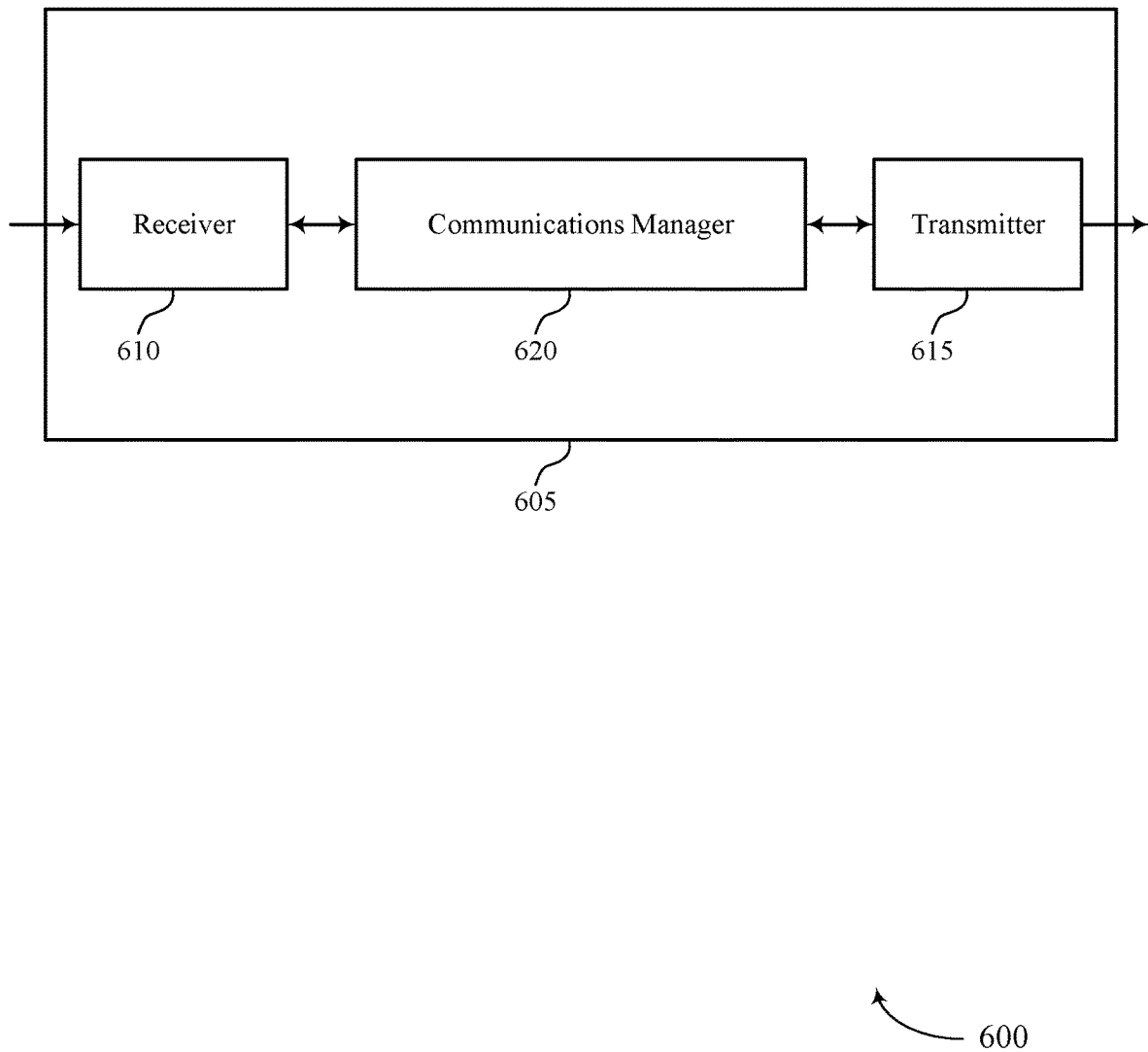
FIGS. 6 and 7 show block diagrams of devices that support techniques for interference-based beam failure detection in accordance with aspects of the present disclosure.

FIG. 6 shows a block diagram 600 of a device 605 that supports techniques for interference-based beam failure detection in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for interference-based beam failure detection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for interference-based beam failure detection). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for interference-based beam failure detection as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving one or more reference signals from a base station on a first beam used for communications between the UE and the base station. The communications manager 620 may be configured as or otherwise support a means for transmitting signaling indicating a beam failure based on one or more measurements of the one or more reference signals and at least one beam failure parameter, where the at least one beam failure parameter is adjusted based at least on part on interference associated with the first beam that is measured based on the one or more reference signals.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for BFR parameter adjustments that may allow for reduced declarations of beam failure by a UE in cases where transient interference or blocking may temporarily interfere with a beam. Such techniques may reduce overhead burden and performance reductions from extra beam failure declarations, and may reduce power consumption associated with extra BFR procedures, may enhance network efficiency, and may reduce latency.

Figure 7:
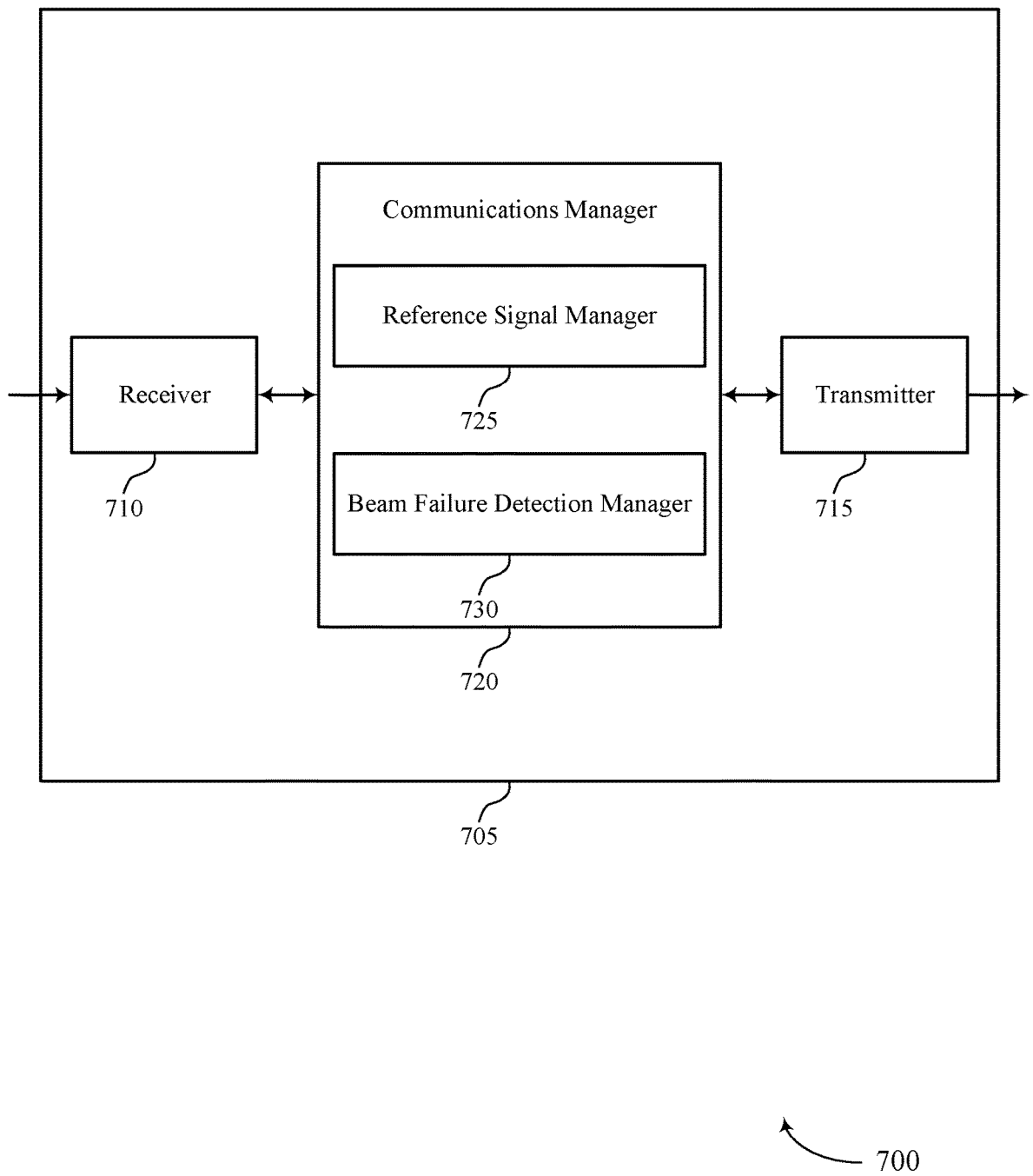

FIG. 7 shows a block diagram 700 of a device 705 that supports techniques for interference-based beam failure detection in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for interference-based beam failure detection). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for interference-based beam failure detection). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for interference-based beam failure detection as described herein. For example, the communications manager 720 may include a reference signal manager 725 a beam failure detection manager 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The reference signal manager 725 may be configured as or otherwise support a means for receiving one or more reference signals from a base station on a first beam used for communications between the UE and the base station. The beam failure detection manager 730 may be configured as or otherwise support a means for transmitting signaling indicating a beam failure based on one or more measurements of the one or more reference signals and at least one beam failure parameter, where the at least one beam failure parameter is adjusted based at least on part on interference associated with the first beam that is measured based on the one or more reference signals.

Figure 8:
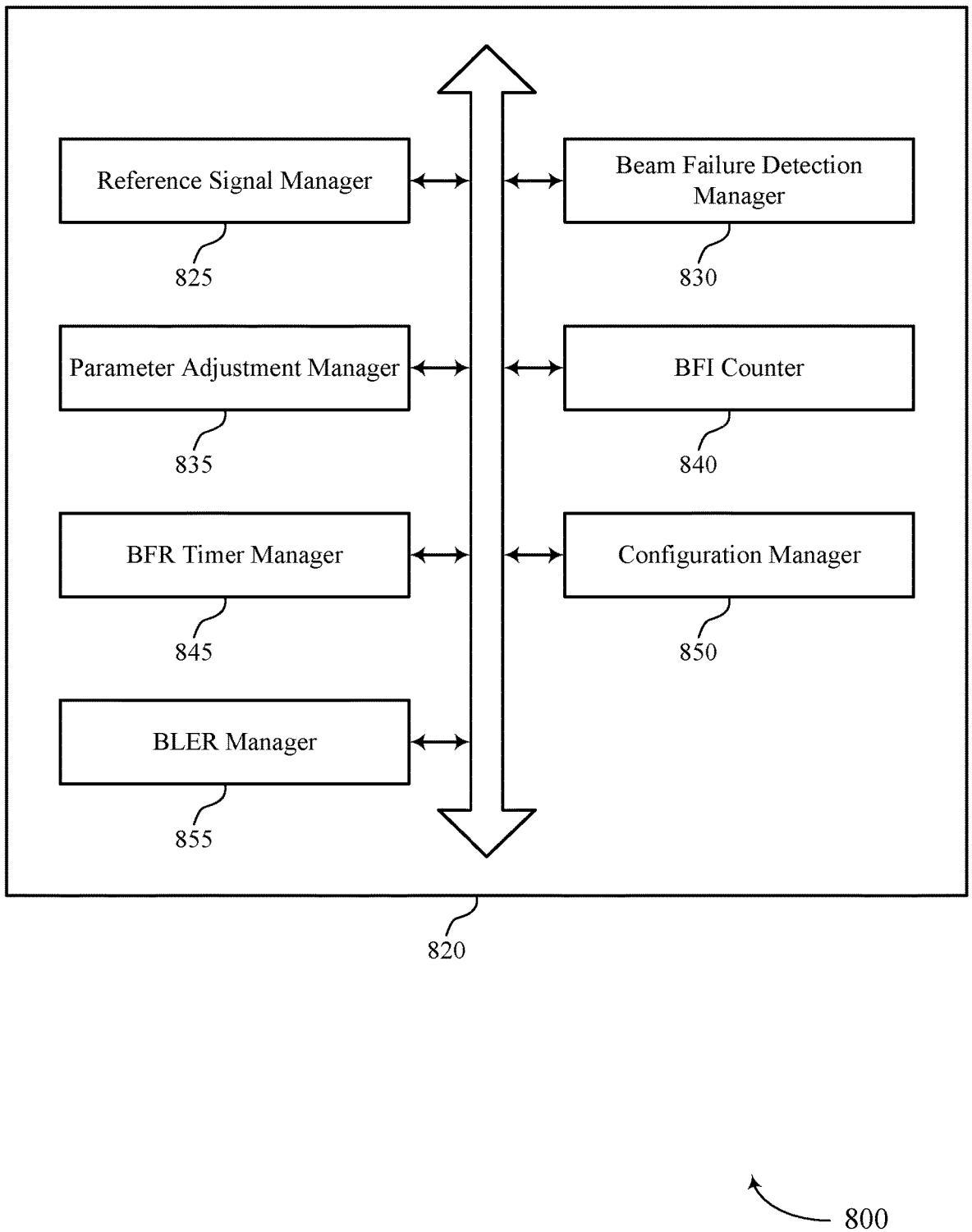
FIG. 8 shows a block diagram of a communications manager that supports techniques for interference-based beam failure detection in accordance with aspects of the present disclosure.

FIG. 8 shows a block diagram 800 of a communications manager 820 that supports techniques for interference-based beam failure detection in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for interference-based beam failure detection as described herein. For example, the communications manager 820 may include a reference signal manager 825, a beam failure detection manager 830, a parameter adjustment manager 835, a BFI counter 840, an BFR timer manager 845, a configuration manager 850, a BLER manager 855, or any combination thereof. Each of these components may communicate, directly or indirectly, with one another (e.g., via one or more buses).

The communications manager 820 may support wireless communication at a UE in accordance with examples as disclosed herein. The reference signal manager 825 may be configured as or otherwise support a means for receiving one or more reference signals from a base station on a first beam used for communications between the UE and the base station. The beam failure detection manager 830 may be configured as or otherwise support a means for transmitting signaling indicating a beam failure based on one or more measurements of the one or more reference signals and at least one beam failure parameter, where the at least one beam failure parameter is adjusted based at least on part on interference associated with the first beam that is measured based on the one or more reference signals.

In some examples, the at least one beam failure parameter includes a BFI that is determined for each of a set of multiple periods in which a first periodic reference signal of the one or more reference signals is measured, and where the method further includes. In some examples, applying a first adjustment to a BFI count when a number of consecutive BFIs is less than a threshold value, and applying a second adjustment to the BFI count when the number of consecutive BFIs is equal to or greater than the threshold value, and where the determining to declare the beam failure is based on an adjusted BFI count.

In some examples, the first adjustment or the second adjustment to the BFI count is reset to zero when a subsequent period of the set of multiple periods fails to generate a BFI. In some examples, the first adjustment of the BFI count triggers a beam failure declaration more slowly than the unadjusted BFI count, and the second adjustment of the BFI count triggers the beam failure declaration more quickly than the unadjusted BFI count.

In some examples, the BFI counter 840 may be configured as or otherwise support a means for transmitting, to the base station, a beam failure declaration based on the number of consecutive BFIs meeting a maximum consecutive BFI count threshold before an expiration of a beam failure declaration timer.

In some examples, the BFR timer manager 845 may be configured as or otherwise support a means for starting, at a MAC layer of the UE, a beam failure recovery (BFR) timer responsive to a BFI provided by a physical layer of the UE. In some examples, the beam failure detection manager 830 may be configured as or otherwise support a means for initiating, at the MAC layer when a maximum consecutive BFI count threshold is reached, one or more of In some examples, the beam failure detection manager 830 may be configured as or otherwise support a means for a random access procedure irrespective of a status of the BFR timer. In some examples, the beam failure detection manager 830 may be configured as or otherwise support a means for a transmission of a request for an aperiodic reference signal from the base station while the BFR timer is unexpired. In some examples, the beam failure detection manager 830 may be configured as or otherwise support a means for a transmission of uplink control information (UCI) to the base station that indicates the beam failure due to interference while the BFR timer is unexpired.

In some examples, the configuration manager 850 may be configured as or otherwise support a means for receiving, from the base station, configuration information that provides the at least one beam failure parameter. In some examples, the parameter adjustment manager 835 may be configured as or otherwise support a means for receiving, from the base station in one or more of DCI or a MAC control element, an indication to enable adjustments of the at least one beam failure parameter.

In some examples, the BFI counter 840 may be configured as or otherwise support a means for determining, for each of a set of multiple periods of a first periodic reference signal of the one or more reference signals, whether a BFI is detected, and where the at least one beam failure parameter includes an adaptive maximum BFI count threshold that is used to determine when to declare the beam failure.

In some examples, the BFI counter 840 may be configured as or otherwise support a means for increasing the adaptive maximum BFI count threshold based at least on part on determining that a BFI is detected for a first number of consecutive periods of the set of multiple periods that is less than a consecutive BFI threshold value.

In some examples, the BFI counter 840 may be configured as or otherwise support a means for decreasing the adaptive maximum BFI count threshold based on determining that the BFI is detected for a second number of consecutive periods of the set of multiple periods that is greater than or equal to the consecutive BFI threshold value.

In some examples, the at least one beam failure parameter includes a BLER threshold value that is used to determine whether to provide a BFI, and where the BLER threshold value is adjusted based at least on part on one or more of a measured channel condition associated with the first beam, a service requirement associated with the communications between the UE and the base station, or any combinations thereof. In some examples, the BLER threshold value is increased based on a measured interference of the first beam being equal to or greater than a measurement criteria, and the BLER threshold value is decreased based on the measured interference of the first beam being less than the measurement criteria. In some examples, the BLER threshold value is adjusted based on multiple configured interference measurement ranges, multiple configured service requirements, an algorithm to calculate the BLER threshold value, or any combinations thereof. In some examples, the service requirement includes a QoS target for one or more of a packet error rate, an average latency, an average data rate, or any combinations thereof. In some examples, the BLER threshold value is adjusted at the UE based on measured channel conditions or service requirements, or is adjusted based on signaling from the base station that indicates an adjustment to the BLER threshold value.

In some examples, the configuration manager 850 may be configured as or otherwise support a means for receiving configuration information from the base station that indicates a set of multiple different BLER threshold values, one or more adaptive BLER threshold calculation algorithms, or any combinations thereof. In some examples, the BLER manager 855 may be configured as or otherwise support a means for adjusting the BLER threshold value based on the configuration information, downlink signaling in a MAC control element or DCI, or any combinations thereof.

Figure 9:
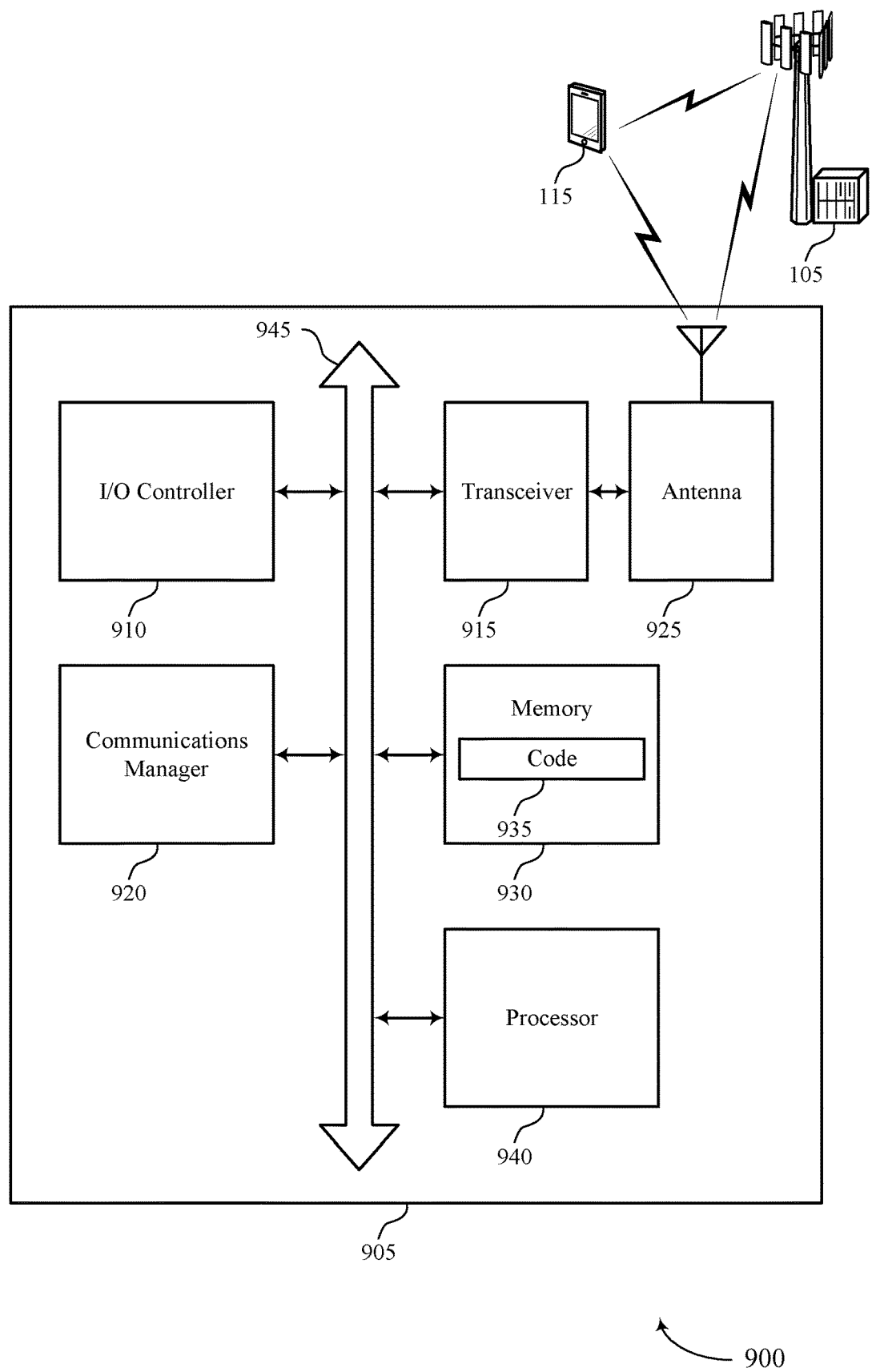
FIG. 9 shows a diagram of a system including a device that supports techniques for interference-based beam failure detection in accordance with aspects of the present disclosure.

FIG. 9 shows a diagram of a system 900 including a device 905 that supports techniques for interference-based beam failure detection in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for interference-based beam failure detection). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving one or more reference signals from a base station on a first beam used for communications between the UE and the base station. The communications manager 920 may be configured as or otherwise support a means for transmitting signaling indicating a beam failure based on one or more measurements of the one or more reference signals and at least one beam failure parameter, where the at least one beam failure parameter is adjusted based at least on part on interference associated with the first beam that is measured based on the one or more reference signals.

By including or configuring the communications manager 920 in accordance with examples as described herein, the device 905 may support techniques for BFR parameter adjustments that may allow for reduced declarations of beam failure by a UE in cases where transient interference or blocking may temporarily interfere with a beam. Such techniques may reduce overhead burden and performance reductions from extra beam failure declarations, and may reduce power consumption associated with extra BFR procedures, may enhance network efficiency, and may reduce latency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for interference-based beam failure detection as described herein, or the processor 940 and the memory 930 may be otherwise configured to perform or support such operations.

Figure 10:
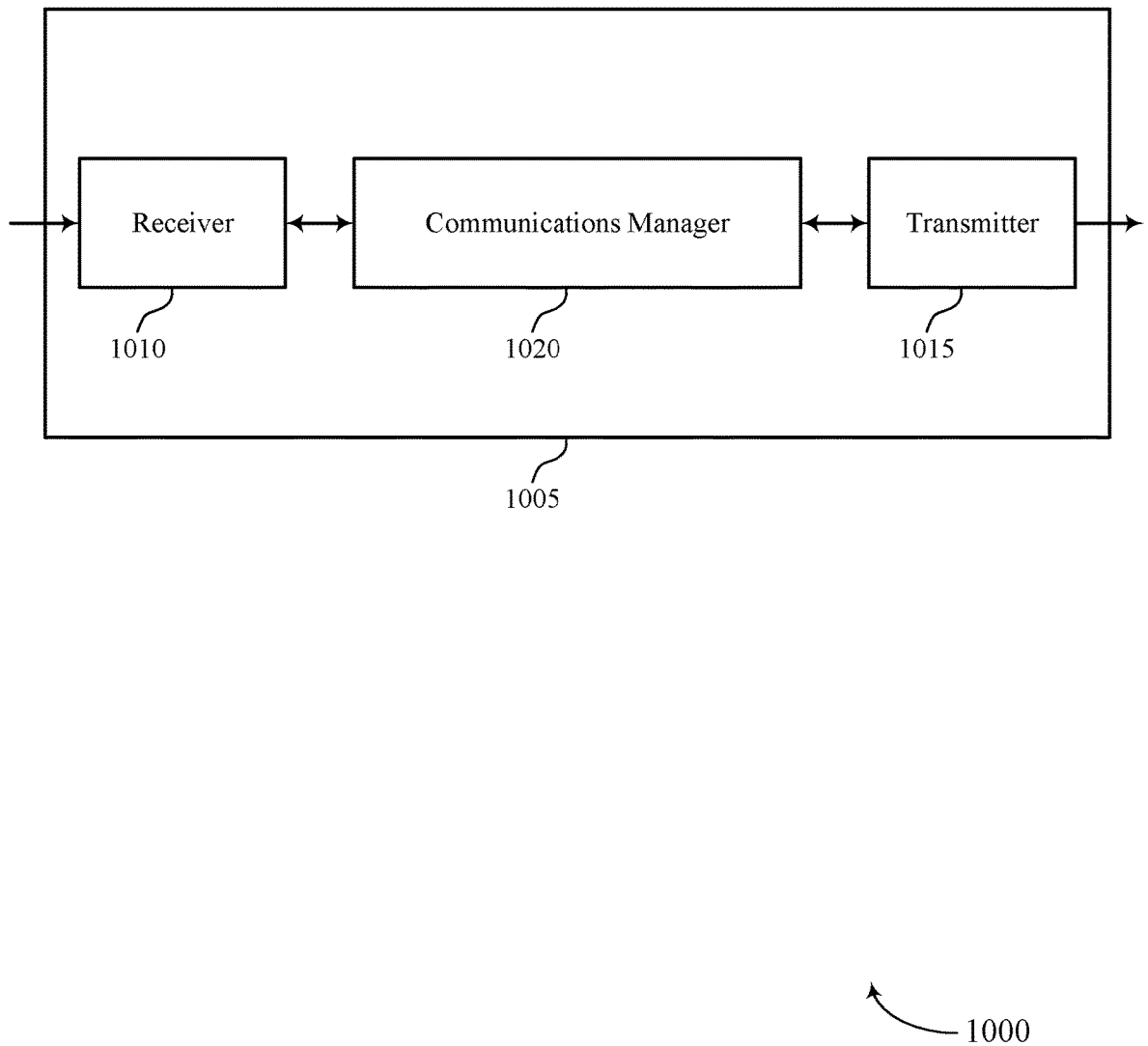
FIGS. 10 and 11 show block diagrams of devices that support techniques for interference-based beam failure detection in accordance with aspects of the present disclosure.

FIG. 10 shows a block diagram 1000 of a device 1005 that supports techniques for interference-based beam failure detection in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for interference-based beam failure detection). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for interference-based beam failure detection). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for interference-based beam failure detection as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for configuring a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters. The communications manager 1020 may be configured as or otherwise support a means for transmitting one or more reference signals to the UE on the first beam, where the one or more beam failure parameters are based on measurements of the one or more reference signals. The communications manager 1020 may be configured as or otherwise support a means for receiving signaling from the UE indicating a beam failure. The communications manager 1020 may be configured as or otherwise support a means for initiating a beam failure recovery in response to the signaling received from the UE.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for BFR parameter adjustments that may allow for reduced declarations of beam failure by a UE in cases where transient interference or blocking may temporarily interfere with a beam. Such techniques may reduce overhead burden and performance reductions from extra beam failure declarations, and may reduce power consumption associated with extra BFR procedures, may enhance network efficiency, and may reduce latency.

Figure 11:
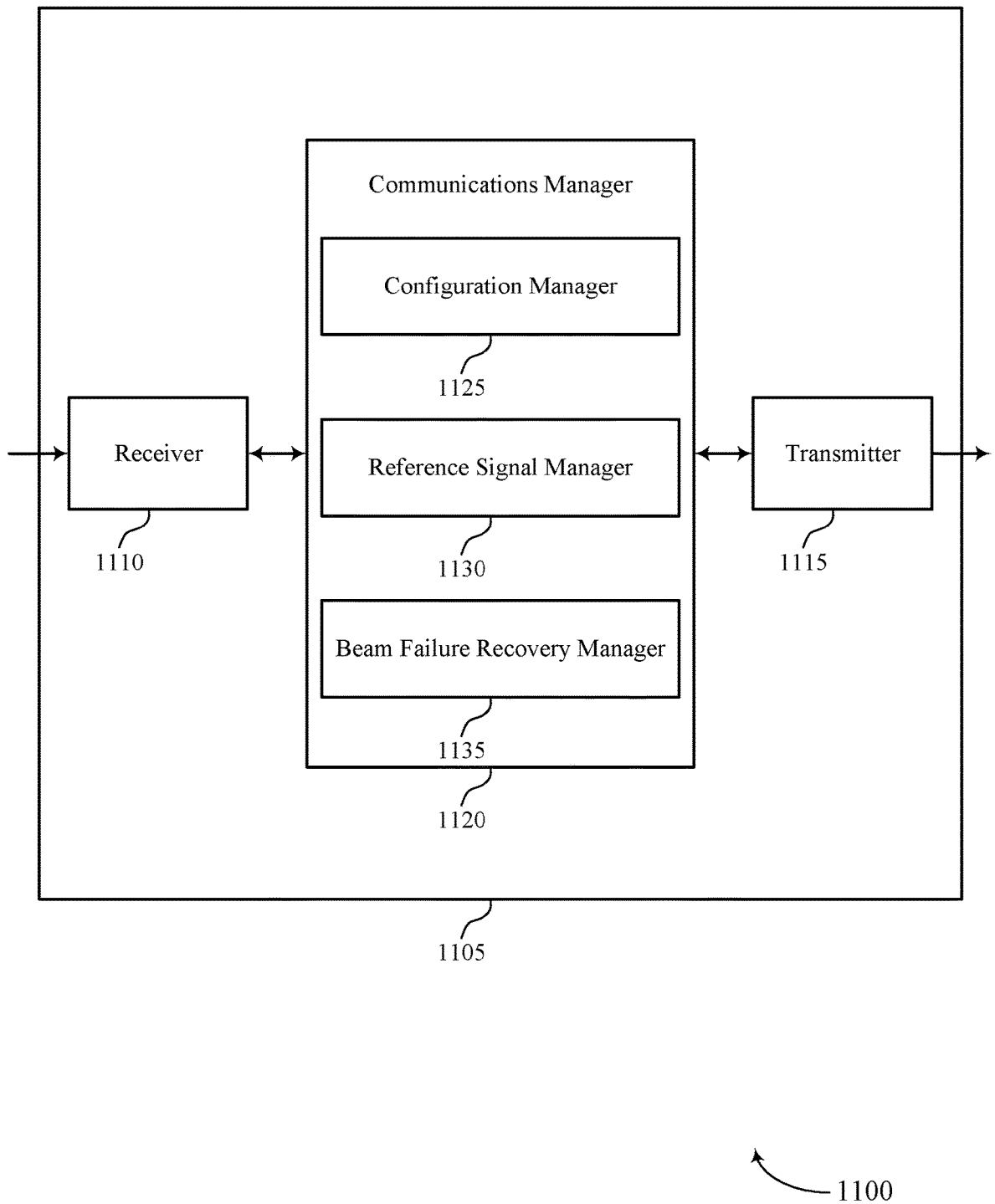

FIG. 11 shows a block diagram 1100 of a device 1105 that supports techniques for interference-based beam failure detection in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for interference-based beam failure detection). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for interference-based beam failure detection). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for interference-based beam failure detection as described herein. For example, the communications manager 1120 may include a configuration manager 1125, a reference signal manager 1130, a beam failure recovery manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The configuration manager 1125 may be configured as or otherwise support a means for configuring a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters. The reference signal manager 1130 may be configured as or otherwise support a means for transmitting one or more reference signals to the UE on the first beam, where the one or more beam failure parameters are based on measurements of the one or more reference signals. The beam failure recovery manager 1135 may be configured as or otherwise support a means for receiving signaling from the UE indicating a beam failure. The beam failure recovery manager 1135 may be configured as or otherwise support a means for initiating a beam failure recovery in response to the signaling received from the UE.

Figure 12:
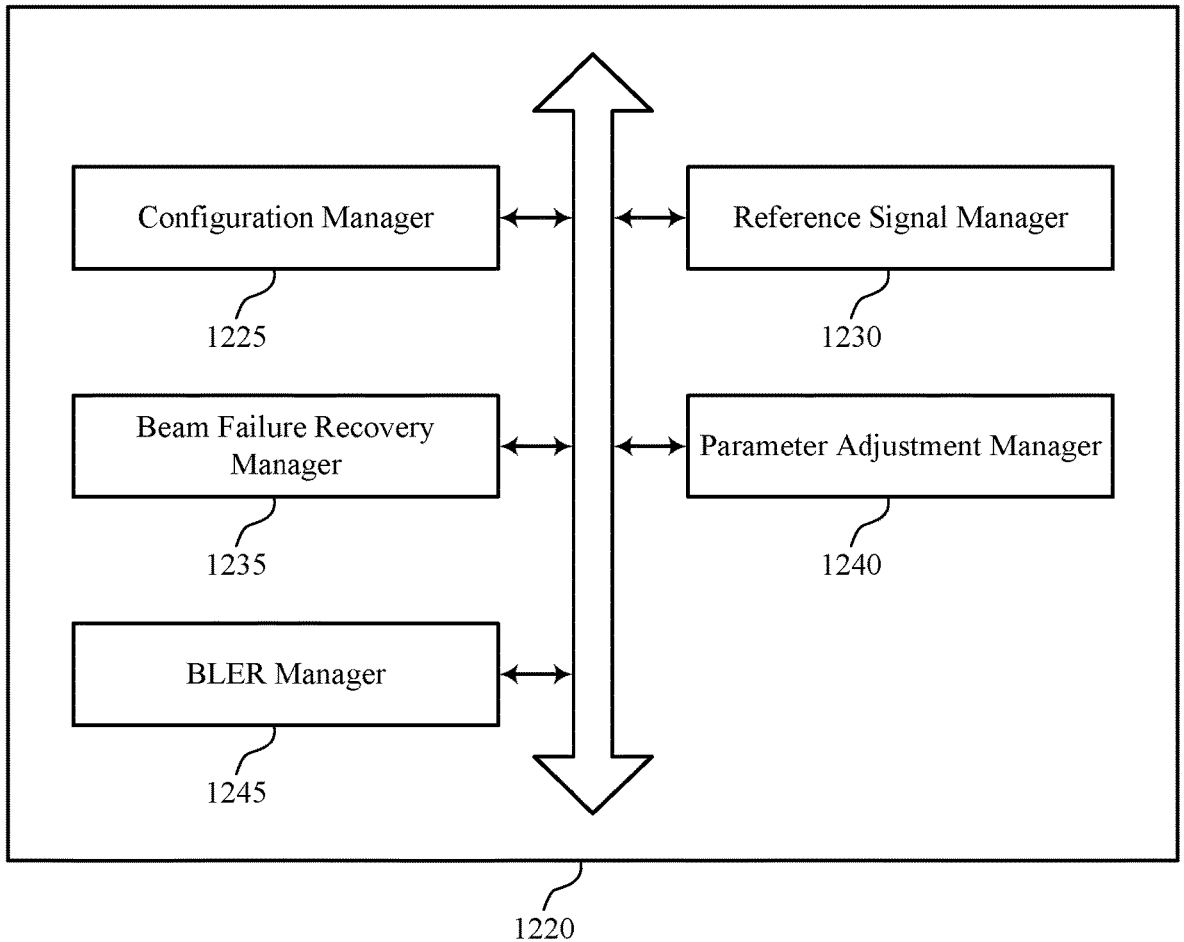
FIG. 12 shows a block diagram of a communications manager that supports techniques for interference-based beam failure detection in accordance with aspects of the present disclosure.

FIG. 12 shows a block diagram 1200 of a communications manager 1220 that supports techniques for interference-based beam failure detection in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for interference-based beam failure detection as described herein. For example, the communications manager 1220 may include a configuration manager 1225, a reference signal manager

1230, a beam failure recovery manager 1235, a parameter adjustment manager 1240, a BLER manager 1245, or any combination thereof. Each of these components may communicate, directly or indirectly, with one another (e.g., via one or more buses).

The communications manager 1220 may support wireless communication at a base station in accordance with examples as disclosed herein. The configuration manager 1225 may be configured as or otherwise support a means for configuring a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters. The reference signal manager 1230 may be configured as or otherwise support a means for transmitting one or more reference signals to the UE on the first beam, where the one or more beam failure parameters are based on measurements of the one or more reference signals. The beam failure recovery manager 1235 may be configured as or otherwise support a means for receiving signaling from the UE indicating a beam failure. In some examples, the beam failure recovery manager 1235 may be configured as or otherwise support a means for initiating a beam failure recovery in response to the signaling received from the UE.

In some examples, the one or more beam failure parameters include a BFI that is determined for each of a set of multiple periods in which a first periodic reference signal of the one or more reference signals is measured, and where the method further includes. In some examples, configuring a first adjustment to a BFI count when a number of consecutive BFIs is less than a threshold value, and a second adjustment to the BFI count when the number of consecutive BFIs is equal to or greater than the threshold value, and where the beam failure declaration is based on an adjusted BFI count.

In some examples, the configuration manager 1225 may be configured as or otherwise support a means for configuring the UE to transmit the beam failure declaration based on the number of consecutive BFIs meeting a maximum consecutive BFI count threshold before an expiration of a beam failure declaration timer.

In some examples, the parameter adjustment manager 1240 may be configured as or otherwise support a means for transmitting, to the UE, in one or more of DCI or a MAC control element, an indication to enable adjustments of the one or more beam failure parameters.

In some examples, to support configuring, the parameter adjustment manager 1240 may be configured as or otherwise support a means for configuring an adaptive maximum BFI count threshold for determining when to declare the beam failure, where the adaptive maximum BFI count threshold is increased based at least in part on determining that a BFI is detected for a first number of consecutive periods of the set of multiple periods that is less than a consecutive BFI threshold value, or the adaptive maximum BFI count threshold is decreased based on determining that the BFI is detected for a second number of consecutive periods of the set of multiple periods that is greater than or equal to the consecutive BFI threshold value.

In some examples, the one or more beam failure parameters include a BLER threshold value that is used to determine a BFI, and where the BLER threshold value is configured to be adjusted based at least on part on one or more of a measured channel condition associated with the first beam, a service requirement associated with the communications between the UE and the base station, or any combinations thereof. In some examples, the BLER threshold value is increased based on a measured interference of the first beam being equal to or greater than a measurement criteria, and the BLER threshold value is decreased based on the measured interference of the first beam being less than the measurement criteria.

In some examples, to support configuring, the BLER manager 1245 may be configured as or otherwise support a means for configuring a set of multiple channel condition measurement ranges that are each associated with a different BLER threshold value, configuring a set of multiple service requirements that are each associated with different BLER threshold values, configuring an algorithm to calculate the BLER threshold value, or any combinations thereof.

In some examples, the BLER manager 1245 may be configured as or otherwise support a means for transmitting, to the UE, signaling to indicate an adjustment to the BLER threshold value.

Figure 13:
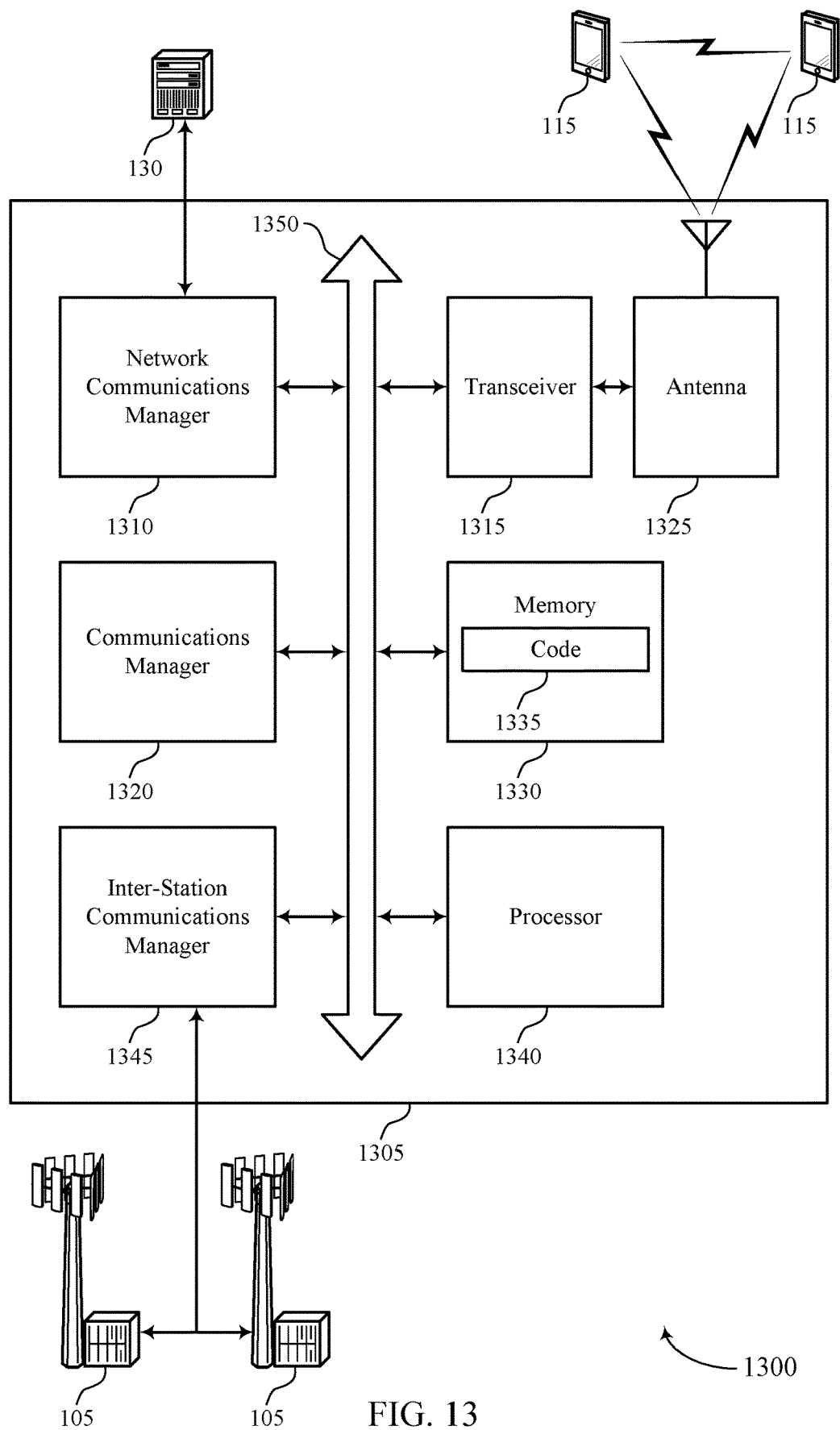
FIG. 13 shows a diagram of a system including a device that supports techniques for interference-based beam failure detection in accordance with aspects of the present disclosure.

FIG. 13 shows a diagram of a system 1300 including a device 1305 that supports techniques for interference-based beam failure detection in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for interference-based beam failure detection). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for configuring a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters. The communications manager 1320 may be configured as or otherwise support a means for transmitting one or more reference signals to the UE on the first beam, where the one or more beam failure parameters are based on measurements of the one or more reference signals. The communications manager 1320 may be configured as or otherwise support a means for receiving signaling from the UE indicating a beam failure. The communications manager 1320 may be configured as or otherwise support a means for initiating a beam failure recovery in response to the signaling received from the UE.

By including or configuring the communications manager 1320 in accordance with examples as described herein, the device 1305 may support techniques for BFR parameter adjustments that may allow for reduced declarations of beam failure by a UE in cases where transient interference or blocking may temporarily interfere with a beam. Such techniques may reduce overhead burden and performance reductions from extra beam failure declarations, and may reduce power consumption associated with extra BFR procedures, may enhance network efficiency, and may reduce latency.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for interference-based beam failure detection as described herein, or the processor 1340 and the memory 1330 may be otherwise configured to perform or support such operations.

Figure 14:
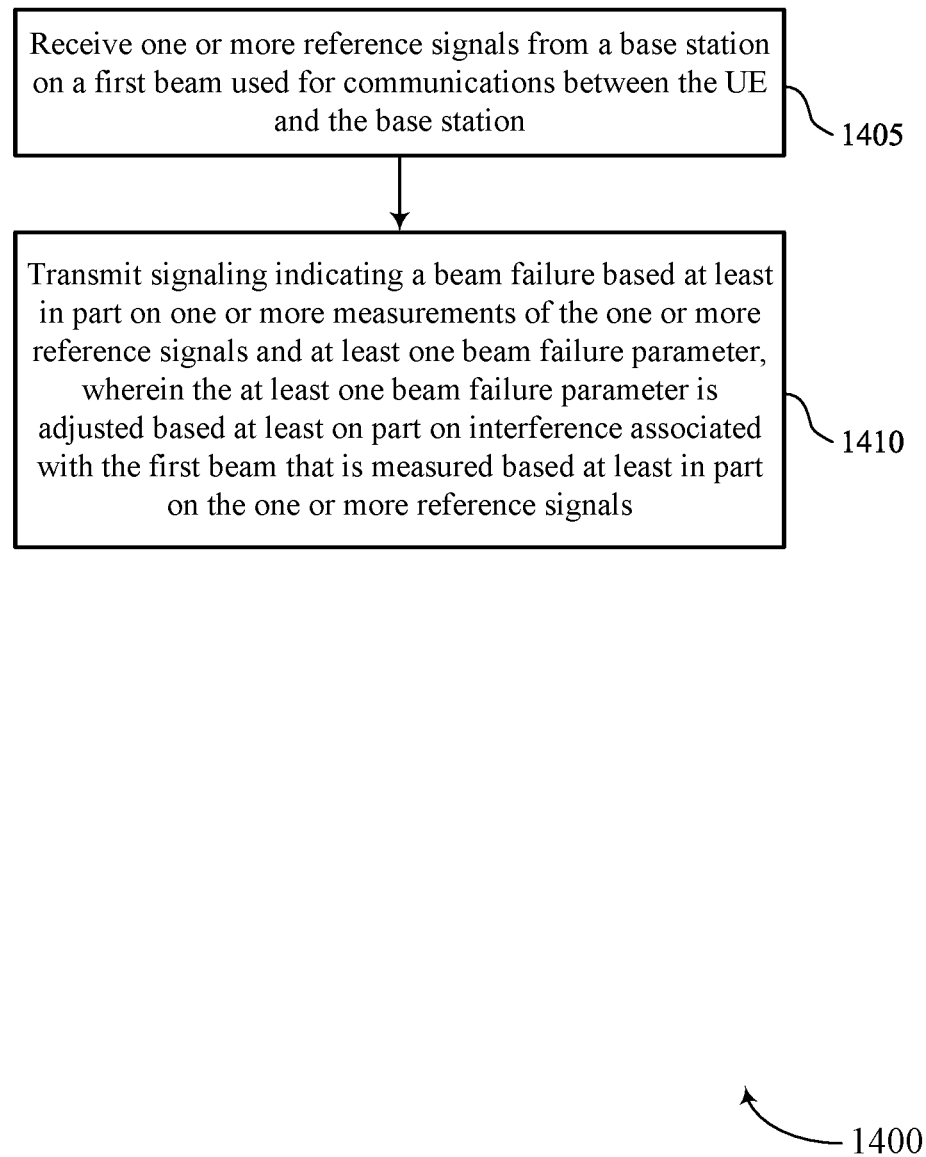
FIGS. 14 through 24 show flowcharts illustrating methods that support techniques for interference-based beam failure detection in accordance with aspects of the present disclosure.

FIG. 14 shows a flowchart illustrating a method 1400 that supports techniques for interference-based beam failure detection in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving one or more reference signals from a base station on a first beam used for communications between the UE and the base station. The operations of 1405 may be performed in accordance with examples as disclosed herein. In some examples, aspects of the operations of 1405 may be performed by a reference signal manager 825 as described with reference to FIG. 8.

At 1410, the method may include transmitting signaling indicating a beam failure based on one or more measurements of the one or more reference signals and at least one beam failure parameter, where the at least one beam failure parameter is adjusted based at least on part on interference associated with the first beam that is measured based on the one or more reference signals. The operations of 1410 may be performed in accordance with examples as disclosed herein. In some examples, aspects of the operations of 1410 may be performed by a beam failure detection manager 830 as described with reference to FIG. 8.

Figure 15:
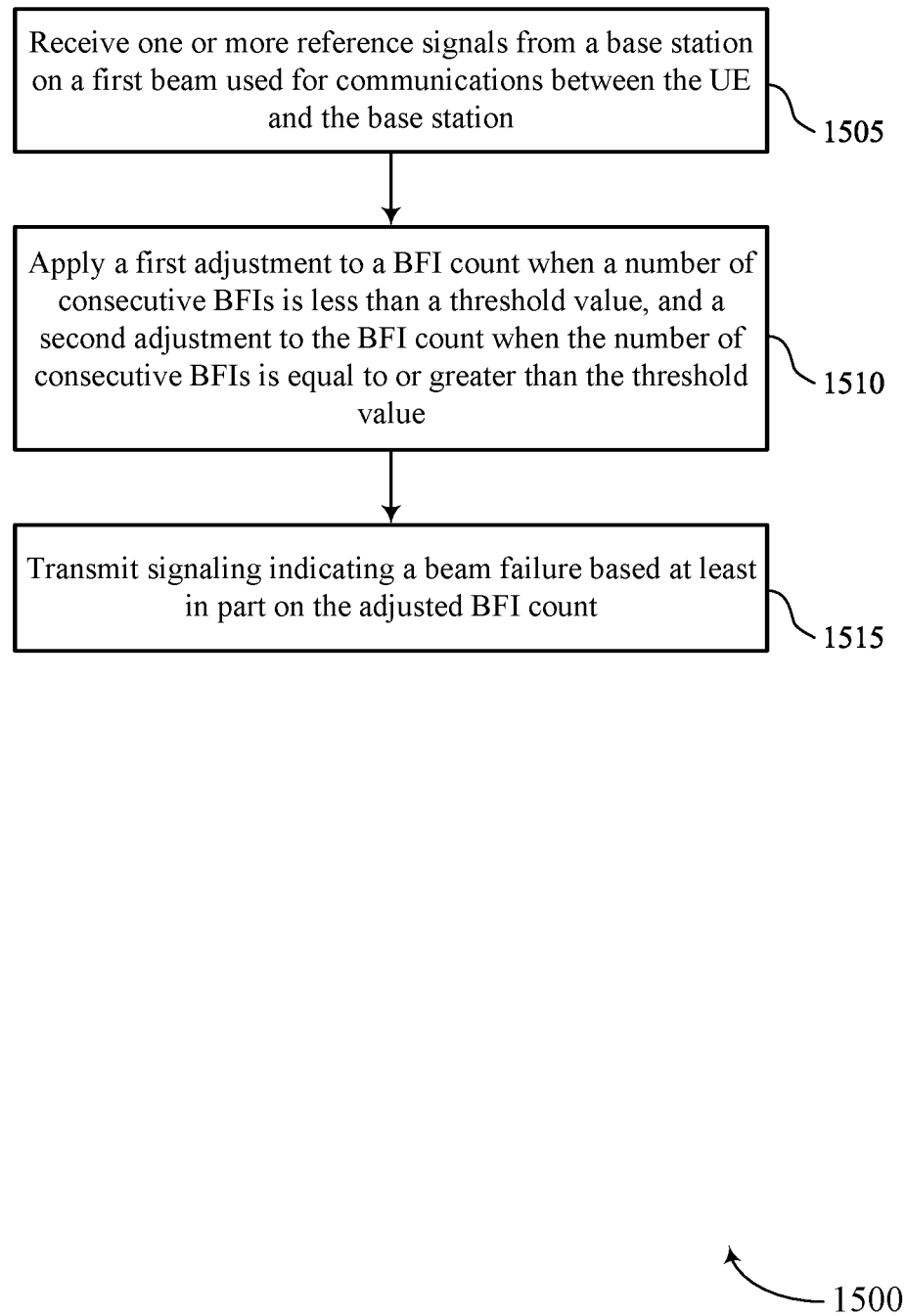

FIG. 15 shows a flowchart illustrating a method 1500 that supports techniques for interference-based beam failure detection in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving one or more reference signals from a base station on a first beam used for communications between the UE and the base station. The operations of 1505 may be performed in accordance with examples as disclosed herein. In some examples, aspects of the operations of 1505 may be performed by a reference signal manager 825 as described with reference to FIG. 8. In some cases, the one or more reference signals include a first periodic reference signal that is measured for BFI.

At 1510, the method may include applying a first adjustment to a BFI count when a number of consecutive BFIs is less than a threshold value, and applying a second adjustment to the BFI count when the number of consecutive BFIs is equal to or greater than the threshold value. The operations of 1510 may be performed in accordance with examples as disclosed herein. In some examples, aspects of the operations of 1510 may be performed by a BFI counter 840 as described with reference to FIG. 8.

At 1515, the method may include transmitting signaling indicating a beam failure based on the adjusted BFI count. The operations of 1515 may be performed in accordance with examples as disclosed herein. In some examples, aspects of the operations of 1515 may be performed by a beam failure detection manager 830 as described with reference to FIG. 8.

Figure 16:
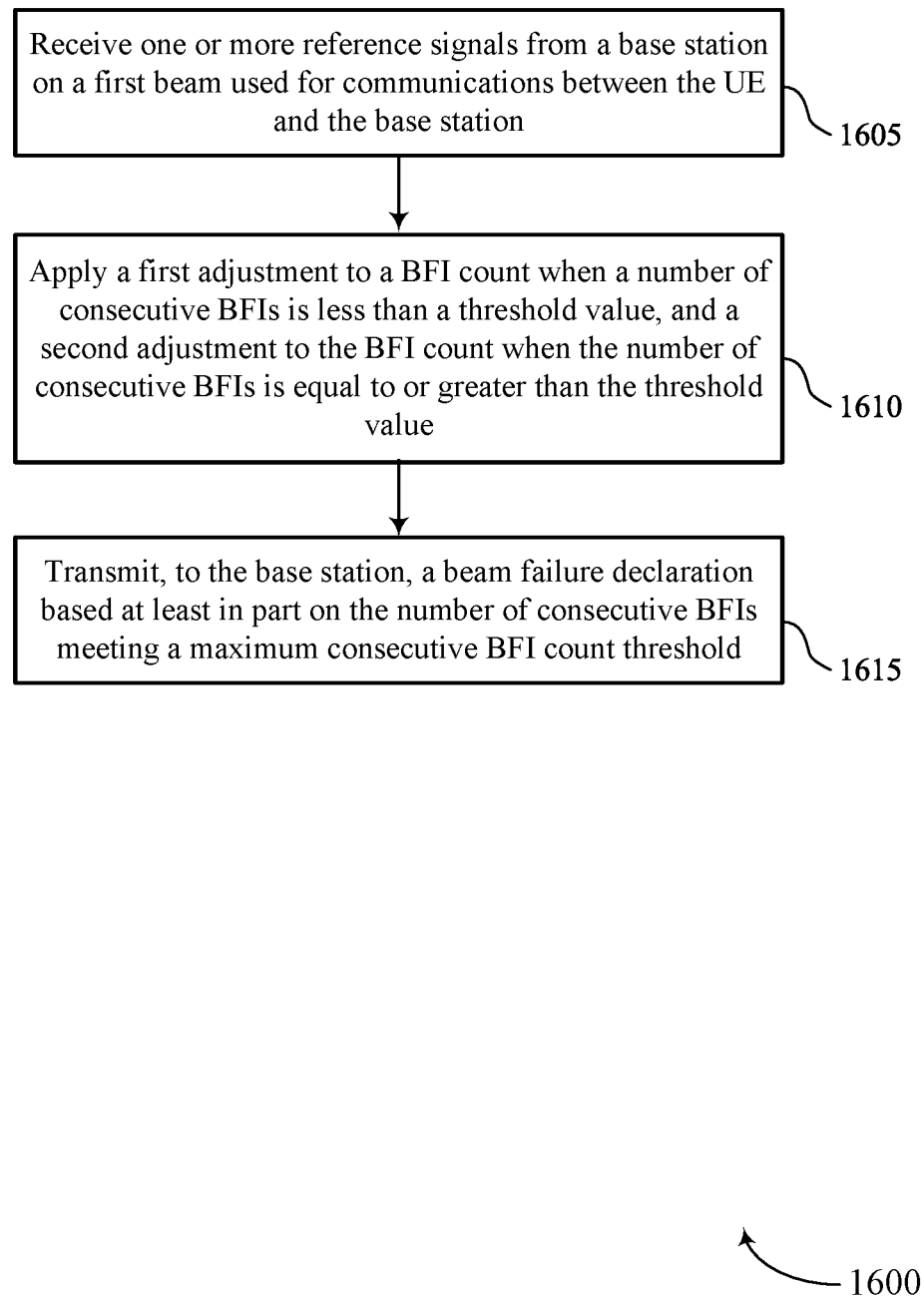

FIG. 16 shows a flowchart illustrating a method 1600 that supports techniques for interference-based beam failure detection in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving one or more reference signals from a base station on a first beam used for communications between the UE and the base station. The operations of 1605 may be performed in accordance with examples as disclosed herein. In some examples, aspects of the operations of 1605 may be performed by a reference signal manager 825 as described with reference to FIG. 8.

At 1610, the method may include applying a first adjustment to a BFI count when a number of consecutive BFIs is less than a threshold value, and applying a second adjustment to the BFI count when the number of consecutive BFIs is equal to or greater than the threshold value, and where the determining to declare the beam failure is based on an adjusted BFI count. The operations of 1610 may be performed in accordance with examples as disclosed herein. In some examples, aspects of the operations of 1610 may be performed by a BFI counter 840 as described with reference to FIG. 8.

At 1615, the method may include transmitting, to the base station, a beam failure declaration based on the number of consecutive BFIs meeting a maximum consecutive BFI count threshold before an expiration of a beam failure declaration timer. The operations of 1615 may be performed in accordance with examples as disclosed herein. In some examples, aspects of the operations of 1615 may be performed by a BFI counter 840 as described with reference to FIG. 8.

Figure 17:
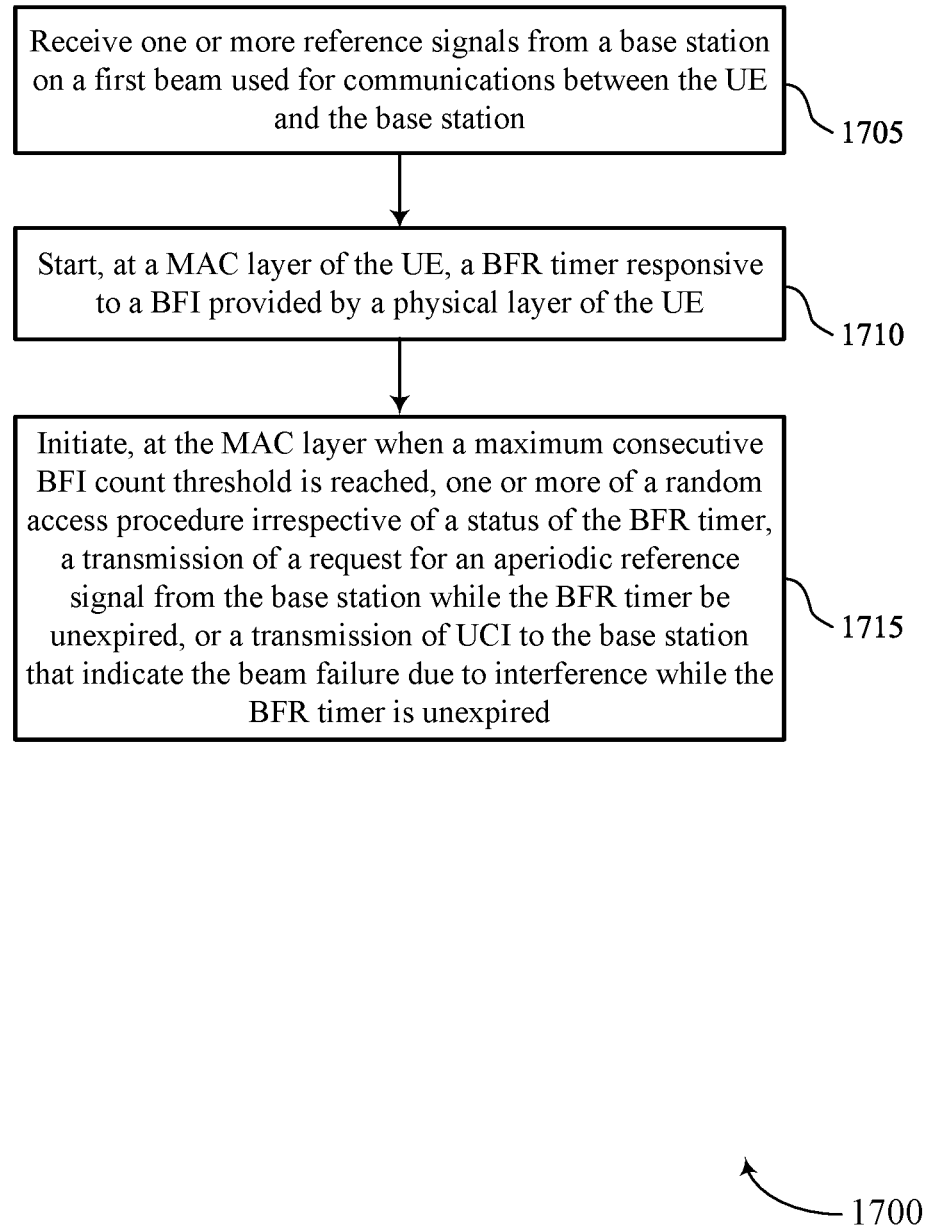

FIG. 17 shows a flowchart illustrating a method 1700 that supports techniques for interference-based beam failure detection in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving one or more reference signals from a base station on a first beam used for communications between the UE and the base station. The operations of 1705 may be performed in accordance with examples as disclosed herein. In some examples, aspects of the operations of 1705 may be performed by a reference signal manager 825 as described with reference to FIG. 8.

At 1710, the method may include starting, at a MAC layer of the UE, a BFR timer responsive to a BFI provided by a physical layer of the UE. The operations of 1710 may be performed in accordance with examples as disclosed herein. In some examples, aspects of the operations of 1710 may be performed by an BFR timer manager 845 as described with reference to FIG. 8.

At 1715, the method may include initiating, at the MAC layer when a maximum consecutive BFI count threshold is reached, one or more of a random access procedure irrespective of a status of the BFR timer, a transmission of a request for an aperiodic reference signal from the base station while the BFR timer be unexpired, or a transmission of UCI to the base station that indicate the beam failure due to interference while the BFR timer is unexpired. The operations of 1715 may be performed in accordance with examples as disclosed herein. In some examples, aspects of the operations of 1715 may be performed by a beam failure detection manager 830 as described with reference to FIG. 8.

Figure 18:
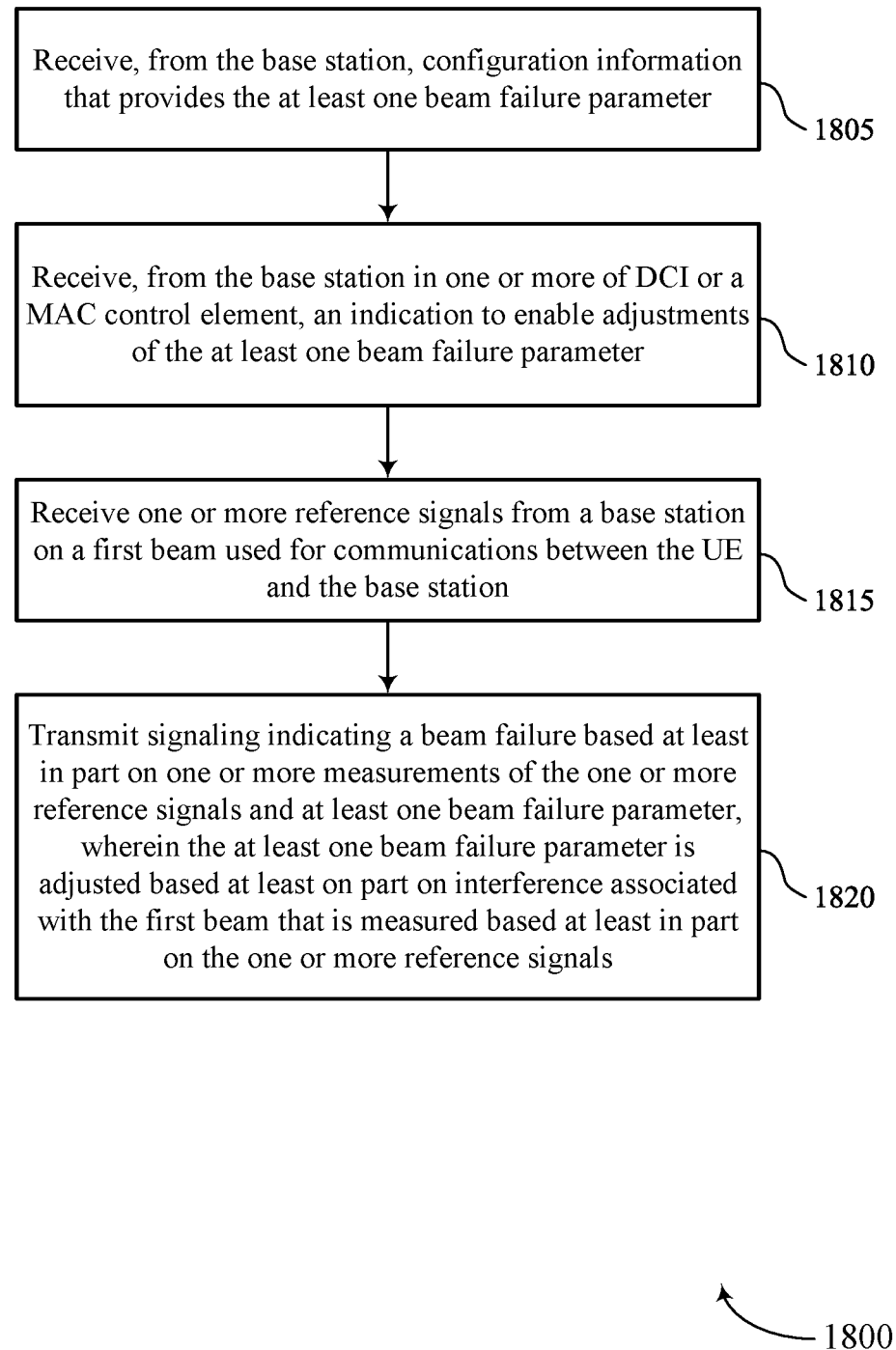

FIG. 18 shows a flowchart illustrating a method 1800 that supports techniques for interference-based beam failure detection in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving, from the base station, configuration information that provides the at least one beam failure parameter. The operations of 1805 may be performed in accordance with examples as disclosed herein. In some examples, aspects of the operations of 1805 may be performed by a configuration manager 850 as described with reference to FIG. 8.

At 1810, the method may include receiving, from the base station in one or more of DCI or a MAC control element, an indication to enable adjustments of the at least one beam failure parameter. The operations of 1810 may be performed in accordance with examples as disclosed herein. In some examples, aspects of the operations of 1810 may be performed by a parameter adjustment manager 835 as described with reference to FIG. 8.

At 1815, the method may include receiving one or more reference signals from a base station on a first beam used for communications between the UE and the base station. The operations of 1815 may be performed in accordance with examples as disclosed herein. In some examples, aspects of the operations of 1815 may be performed by a reference signal manager 825 as described with reference to FIG. 8.

At 1820, the method may include transmitting signaling indicating a beam failure based on one or more measurements of the one or more reference signals and at least one beam failure parameter, where the at least one beam failure parameter is adjusted based at least on part on interference associated with the first beam that is measured based on the one or more reference signals. The operations of 1820 may be performed in accordance with examples as disclosed herein. In some examples, aspects of the operations of 1820 may be performed by a beam failure detection manager 830 as described with reference to FIG. 8.

Figure 19:
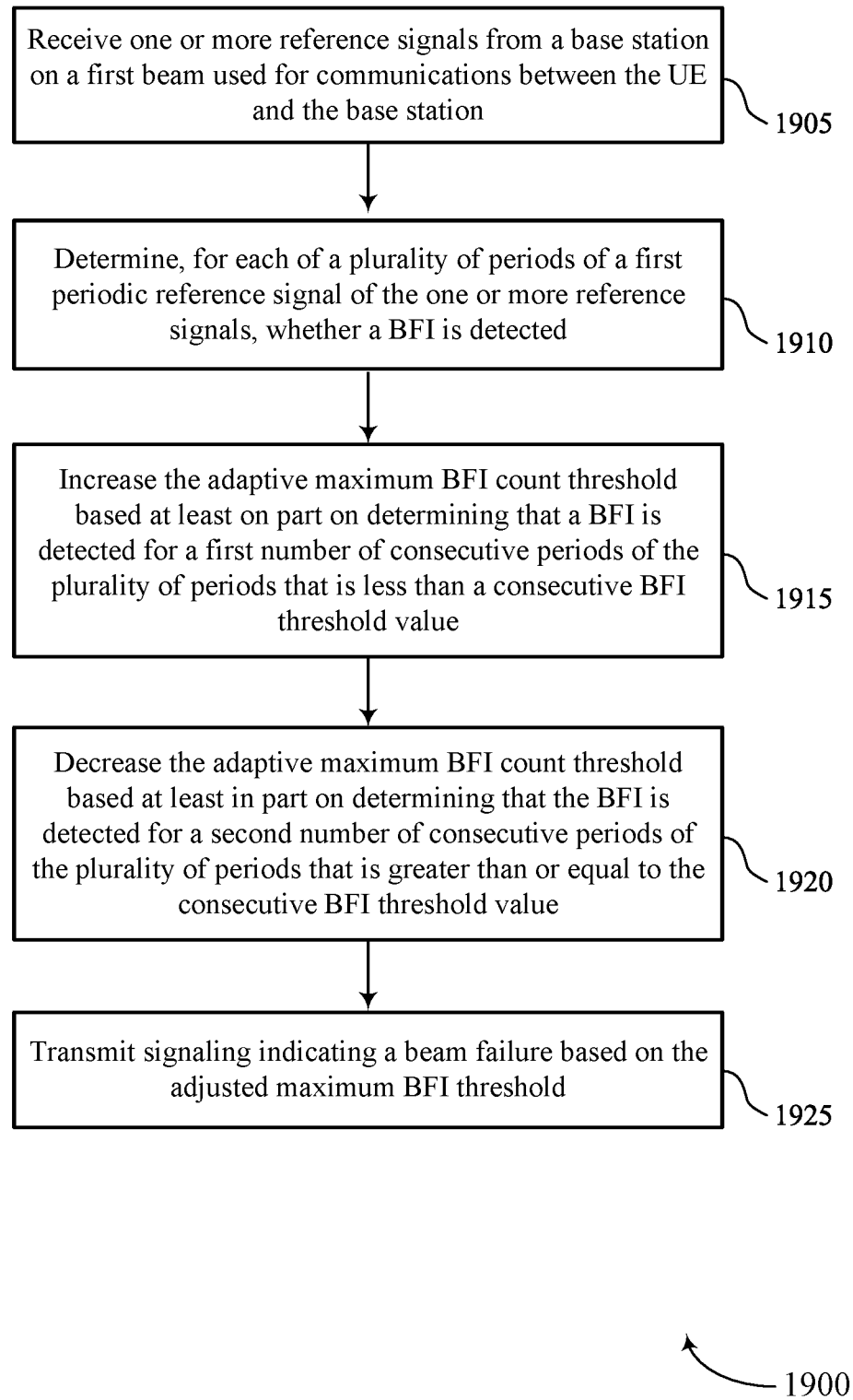

FIG. 19 shows a flowchart illustrating a method 1900 that supports techniques for interference-based beam failure detection in accordance with aspects of the present disclosure. The operations of the method 1900 may be implemented by a UE or its components as described herein. For example, the operations of the method 1900 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1905, the method may include receiving one or more reference signals from a base station on a first beam used for communications between the UE and the base station. The operations of 1905 may be performed in accordance with examples as disclosed herein. In some examples, aspects of the operations of 1905 may be performed by a reference signal manager 825 as described with reference to FIG. 8.

At 1910, the method may include determining, for each of a set of multiple periods of a first periodic reference signal of the one or more reference signals, whether a BFI is detected. The operations of 1910 may be performed in accordance with examples as disclosed herein. In some examples, aspects of the operations of 1910 may be performed by a BFI counter 840 as described with reference to FIG. 8.

At 1915, the method may include increasing the adaptive maximum BFI count threshold based at least on part on determining that a BFI is detected for a first number of consecutive periods of the set of multiple periods that is less than a consecutive BFI threshold value. The operations of 1915 may be performed in accordance with examples as disclosed herein. In some examples, aspects of the operations of 1915 may be performed by a BFI counter 840 as described with reference to FIG. 8.

At 1920, the method may include decreasing the adaptive maximum BFI count threshold based on determining that the BFI is detected for a second number of consecutive periods of the set of multiple periods that is greater than or equal to the consecutive BFI threshold value. The operations of 1920 may be performed in accordance with examples as disclosed herein. In some examples, aspects of the operations of 1920 may be performed by a BFI counter 840 as described with reference to FIG. 8.

At 1925, the method may include transmitting signaling indicating a beam failure based on the adjusted maximum BFI threshold. The operations of 1925 may be performed in accordance with examples as disclosed herein. In some examples, aspects of the operations of 1925 may be performed by a beam failure detection manager 830 as described with reference to FIG. 8.

Figure 20:
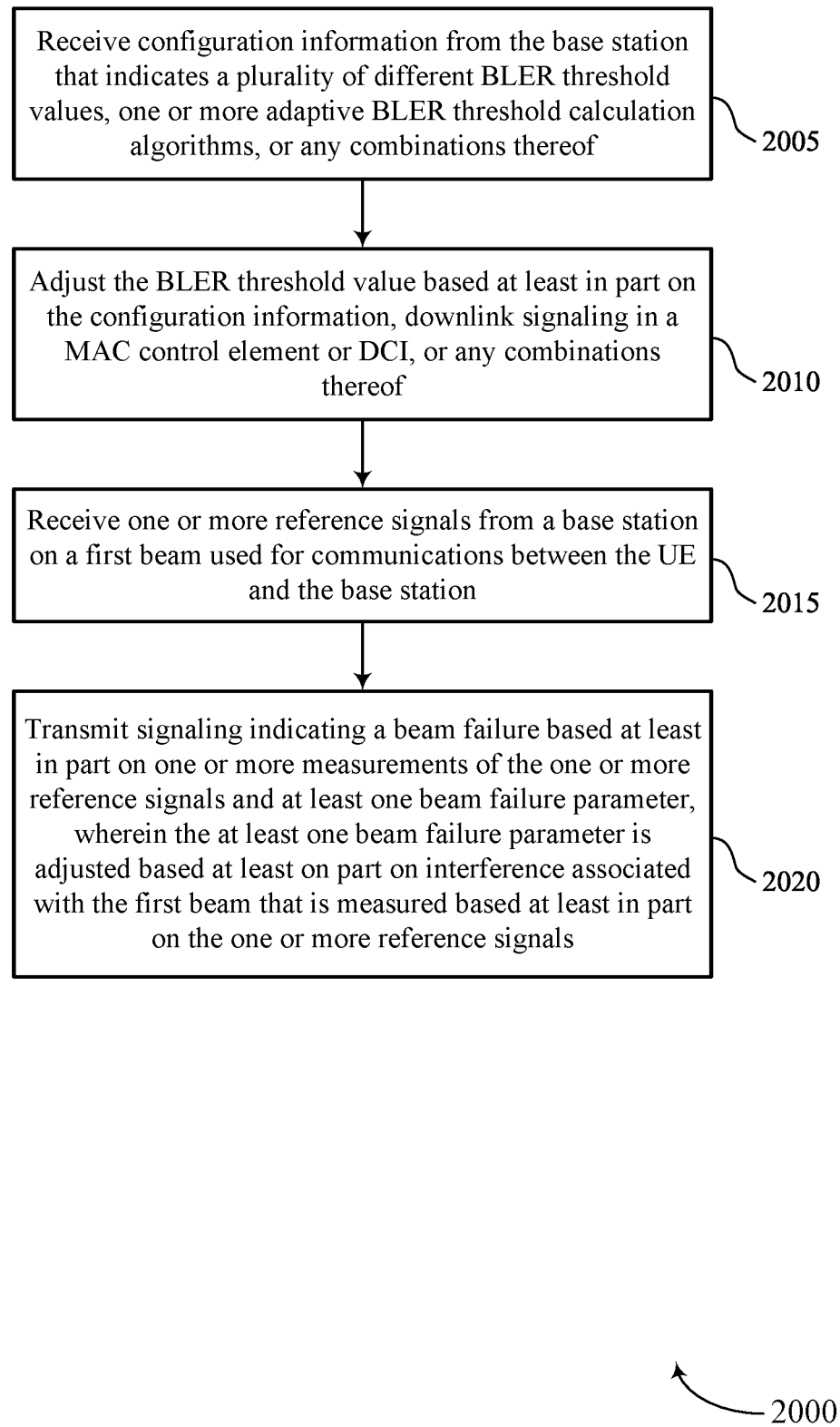

FIG. 20 shows a flowchart illustrating a method 2000 that supports techniques for interference-based beam failure detection in accordance with aspects of the present disclosure. The operations of the method 2000 may be implemented by a UE or its components as described herein. For example, the operations of the method 2000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 2005, the method may include receiving configuration information from the base station that indicates a set of multiple different BLER threshold values, one or more adaptive BLER threshold calculation algorithms, or any combinations thereof. The operations of 2005 may be performed in accordance with examples as disclosed herein. In some examples, aspects of the operations of 2005 may be performed by a configuration manager 850 as described with reference to FIG. 8.

At 2010, the method may include adjusting the BLER threshold value based on the configuration information, downlink signaling in a MAC control element or DCI, or any combinations thereof. The operations of 2010 may be performed in accordance with examples as disclosed herein. In some examples, aspects of the operations of 2010 may be performed by a BLER manager 855 as described with reference to FIG. 8.

At 2015, the method may include receiving one or more reference signals from a base station on a first beam used for communications between the UE and the base station. The operations of 2015 may be performed in accordance with examples as disclosed herein. In some examples, aspects of the operations of 2015 may be performed by a reference signal manager 825 as described with reference to FIG. 8.

At 2020, the method may include transmitting signaling indicating a beam failure based on one or more measurements of the one or more reference signals and at least one beam failure parameter, where the at least one beam failure parameter is adjusted based at least on part on interference associated with the first beam that is measured based on the one or more reference signals. The operations of 2020 may be performed in accordance with examples as disclosed herein. In some examples, aspects of the operations of 2020 may be performed by a beam failure detection manager 830 as described with reference to FIG. 8. In some cases, the at least one beam failure parameter includes a BLER threshold value that is used to determine whether to provide a BFI, and where the BLER threshold value is adjusted based at least on part on one or more of a measured interference associated with the first beam, a service requirement associated with the communications between the UE and the base station, or any combinations thereof.

Figure 21:
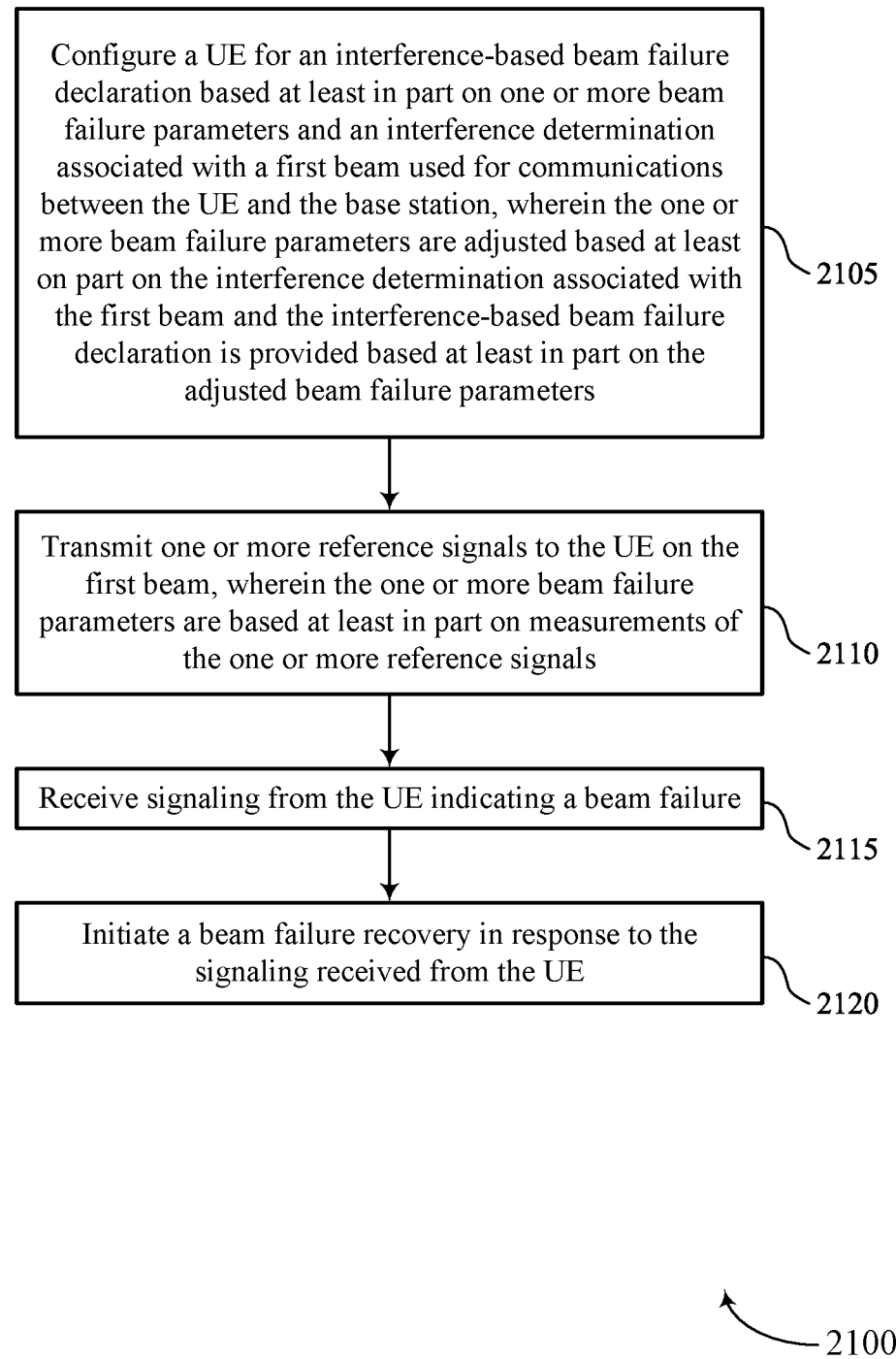

FIG. 21 shows a flowchart illustrating a method 2100 that supports techniques for interference-based beam failure detection in accordance with aspects of the present disclosure. The operations of the method 2100 may be implemented by a base station or its components as described herein. For example, the operations of the method 2100 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2105, the method may include configuring a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters. The operations of 2105 may be performed in accordance with examples as disclosed herein. In some examples, aspects of the operations of 2105 may be performed by a configuration manager 1225 as described with reference to FIG. 12.

At 2110, the method may include transmitting one or more reference signals to the UE on the first beam, where the one or more beam failure parameters are based on measurements of the one or more reference signals. The operations of 2110 may be performed in accordance with examples as disclosed herein. In some examples, aspects of the operations of 2110 may be performed by a reference signal manager 1230 as described with reference to FIG. 12.

At 2115, the method may include receiving signaling from the UE indicating a beam failure. The operations of 2115 may be performed in accordance with examples as disclosed herein. In some examples, aspects of the operations of 2115 may be performed by a beam failure recovery manager 1235 as described with reference to FIG. 12.

At 2120, the method may include initiating a beam failure recovery in response to the signaling received from the UE. The operations of 2120 may be performed in accordance with examples as disclosed herein. In some examples, aspects of the operations of 2120 may be performed by a beam failure recovery manager 1235 as described with reference to FIG. 12.

Figure 22:
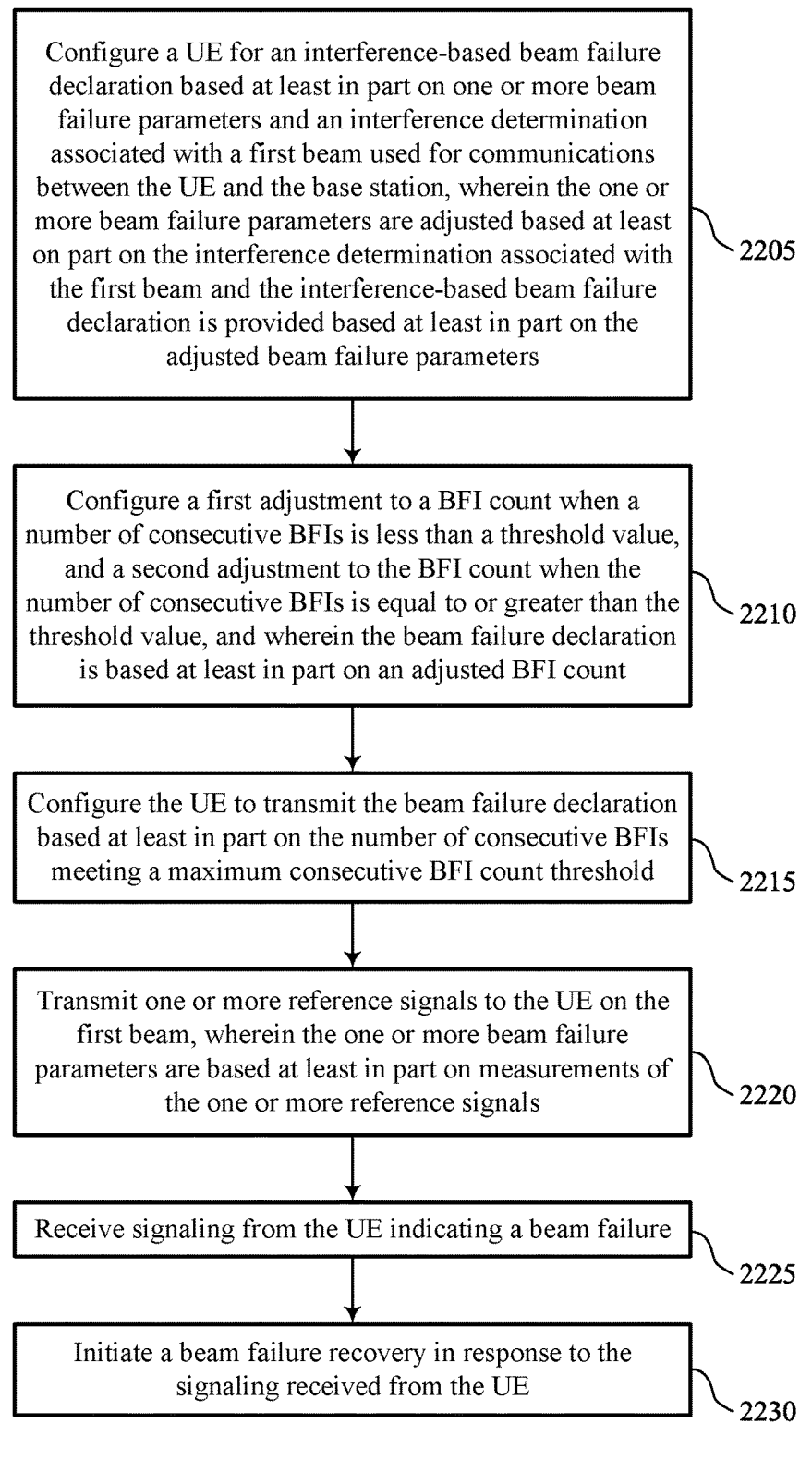

FIG. 22 shows a flowchart illustrating a method 2200 that supports techniques for interference-based beam failure detection in accordance with aspects of the present disclosure. The operations of the method 2200 may be implemented by a base station or its components as described herein. For example, the operations of the method 2200 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2205, the method may include configuring a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters. The operations of 2205 may be performed in accordance with examples as disclosed herein. In some examples, aspects of the operations of 2205 may be performed by a configuration manager 1225 as described with reference to FIG. 12.

At 2210, the method may include configuring a first adjustment to a BFI count when a number of consecutive BFIs is less than a threshold value, and a second adjustment to the BFI count when the number of consecutive BFIs is equal to or greater than the threshold value, and where the beam failure declaration is based on an adjusted BFI count. The operations of 2210 may be performed in accordance with examples as disclosed herein. In some examples, aspects of the operations of 2210 may be performed by a configuration manager 1225 as described with reference to FIG. 12.

At 2215, the method may include configuring the UE to transmit the beam failure declaration based on the number of consecutive BFIs meeting a maximum consecutive BFI count threshold before an expiration of a beam failure declaration timer. The operations of 2215 may be performed in accordance with examples as disclosed herein. In some examples, aspects of the operations of 2215 may be performed by a configuration manager 1225 as described with reference to FIG. 12.

At 2220, the method may include transmitting one or more reference signals to the UE on the first beam, where the one or more beam failure parameters are based on measurements of the one or more reference signals. The operations of 2220 may be performed in accordance with examples as disclosed herein. In some examples, aspects of the operations of 2220 may be performed by a reference signal manager 1230 as described with reference to FIG. 12.

At 2225, the method may include receiving signaling from the UE indicating a beam failure. The operations of 2225 may be performed in accordance with examples as disclosed herein. In some examples, aspects of the operations of 2225 may be performed by a beam failure recovery manager 1235 as described with reference to FIG. 12.

At 2230, the method may include initiating a beam failure recovery in response to the signaling received from the UE. The operations of 2230 may be performed in accordance with examples as disclosed herein. In some examples, aspects of the operations of 2230 may be performed by a beam failure recovery manager 1235 as described with reference to FIG. 12.

Figure 23:
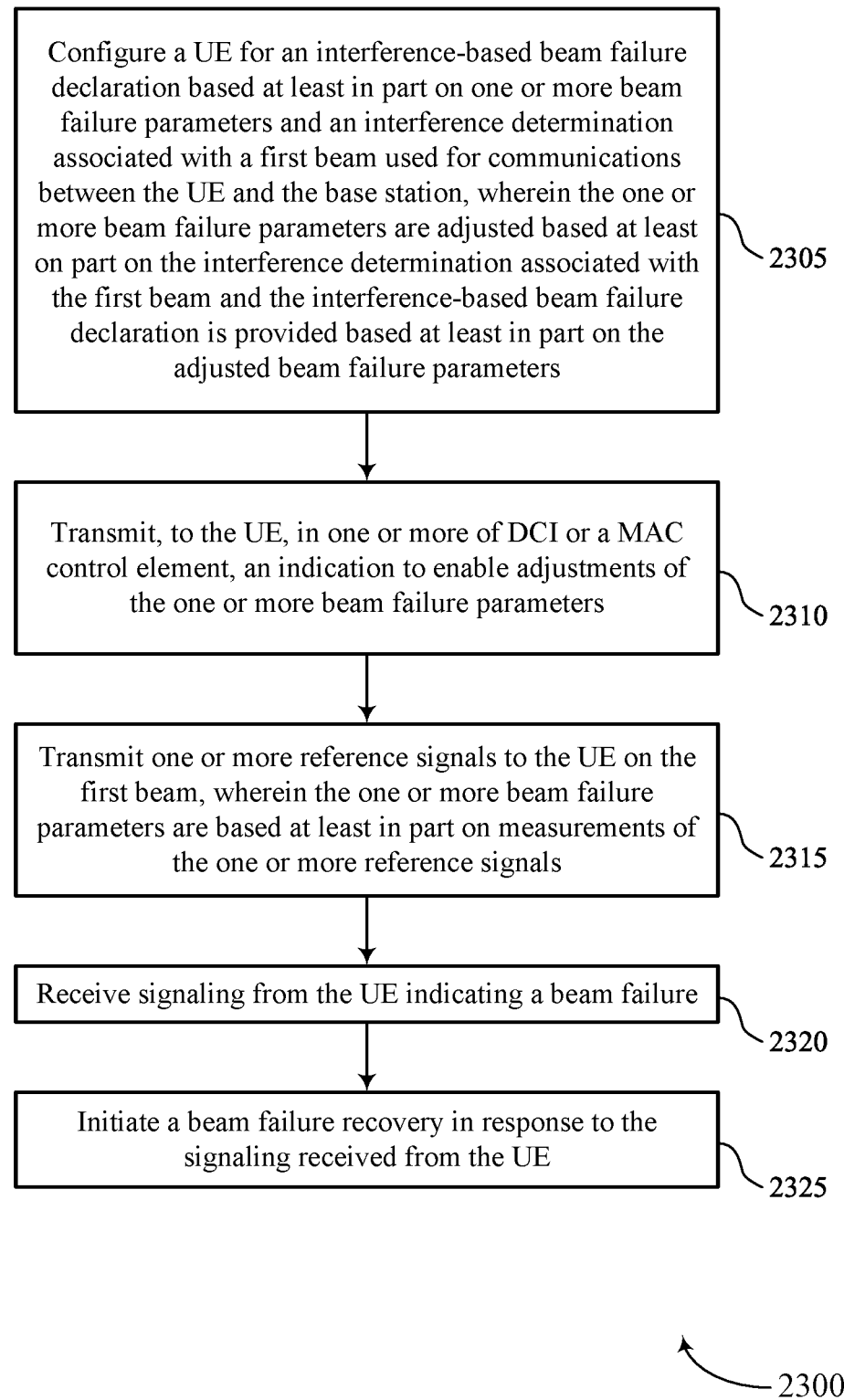

FIG. 23 shows a flowchart illustrating a method 2300 that supports techniques for interference-based beam failure detection in accordance with aspects of the present disclosure. The operations of the method 2300 may be implemented by a base station or its components as described herein. For example, the operations of the method 2300 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2305, the method may include configuring a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters. The operations of 2305 may be performed in accordance with examples as disclosed herein. In some examples, aspects of the operations of 2305 may be performed by a configuration manager 1225 as described with reference to FIG. 12.

At 2310, the method may include transmitting, to the UE, in one or more of DCI or a MAC control element, an indication to enable adjustments of the one or more beam failure parameters. The operations of 2310 may be performed in accordance with examples as disclosed herein. In some examples, aspects of the operations of 2310 may be performed by a parameter adjustment manager 1240 as described with reference to FIG. 12.

At 2315, the method may include transmitting one or more reference signals to the UE on the first beam, where the one or more beam failure parameters are based on measurements of the one or more reference signals. The operations of 2315 may be performed in accordance with examples as disclosed herein. In some examples, aspects of the operations of 2315 may be performed by a reference signal manager 1230 as described with reference to FIG. 12.

At 2320, the method may include receiving signaling from the UE indicating a beam failure. The operations of 2320 may be performed in accordance with examples as disclosed herein. In some examples, aspects of the operations of 2320 may be performed by a beam failure recovery manager 1235 as described with reference to FIG. 12.

At 2325, the method may include initiating a beam failure recovery in response to the signaling received from the UE. The operations of 2325 may be performed in accordance with examples as disclosed herein. In some examples, aspects of the operations of 2325 may be performed by a beam failure recovery manager 1235 as described with reference to FIG. 12.

Figure 24:
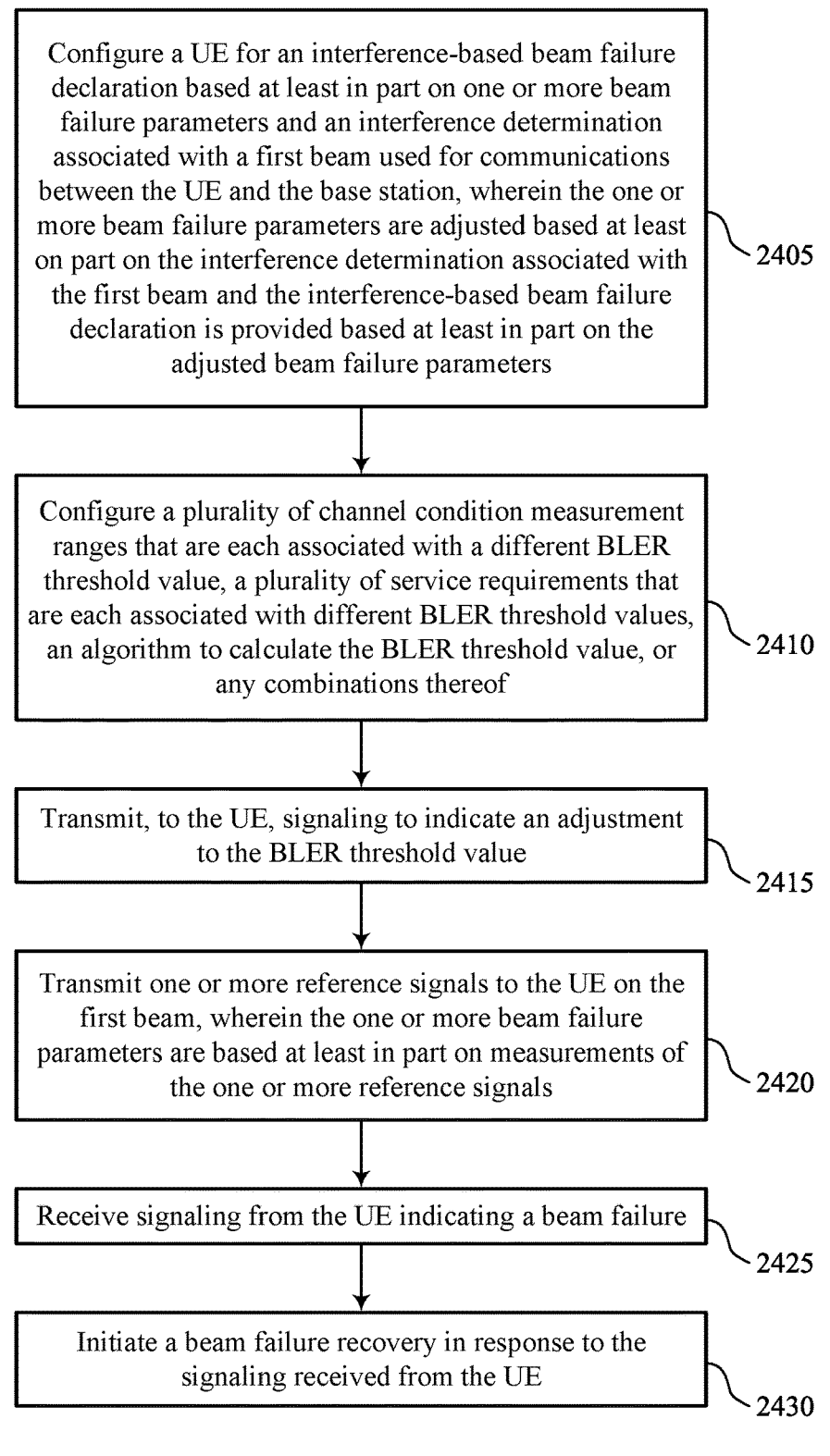

FIG. 24 shows a flowchart illustrating a method 2400 that supports techniques for interference-based beam failure detection in accordance with aspects of the present disclosure. The operations of the method 2400 may be implemented by a base station or its components as described herein. For example, the operations of the method 2400 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2405, the method may include configuring a UE for an interference-based beam failure declaration based on one or more beam failure parameters and an interference determination associated with a first beam used for communications between the UE and the base station, where the one or more beam failure parameters are adjusted based at least on part on the interference determination associated with the first beam and the interference-based beam failure declaration is provided based on the adjusted beam failure parameters. The operations of 2405 may be performed in accordance with examples as disclosed herein. In some examples, aspects of the operations of 2405 may be performed by a configuration manager 1225 as described with reference to FIG. 12. In some cases, the one or more beam failure parameters including a BLER threshold value that is used to determine a BFI, and where the BLER threshold value is configured to be adjusted based at least on part on one or more of a measured channel condition associated with the first beam, a service requirement associated with the communications between the UE and the base station, or any combinations thereof. In some cases, the BLER threshold value being increased based on a measured interference of the first beam being equal to or greater than a measurement criteria, and the BLER threshold value is decreased based on the measured interference of the first beam being less than the measurement criteria.

At 2410, the method may include configuring a set of multiple channel condition measurement ranges that are each associated with a different BLER threshold value, configuring a set of multiple service requirements that are each associated with different BLER threshold values, configuring an algorithm to calculate the BLER threshold value, or any combinations thereof. The operations of 2410 may be performed in accordance with examples as disclosed herein. In some examples, aspects of the operations of 2410 may be performed by a BLER manager 1245 as described with reference to FIG. 12.

At 2415, the method may include transmitting, to the UE, signaling to indicate an adjustment to the BLER threshold value. The operations of 2415 may be performed in accordance with examples as disclosed herein. In some examples, aspects of the operations of 2415 may be performed by a BLER manager 1245 as described with reference to FIG. 12.

At 2420, the method may include transmitting one or more reference signals to the UE on the first beam, where the one or more beam failure parameters are based on measurements of the one or more reference signals. The operations of 2420 may be performed in accordance with examples as disclosed herein. In some examples, aspects of the operations of 2420 may be performed by a reference signal manager 1230 as described with reference to FIG. 12.

At 2425, the method may include receiving signaling from the UE indicating a beam failure. The operations of 2425 may be performed in accordance with examples as disclosed herein. In some examples, aspects of the operations of 2425 may be performed by a beam failure recovery manager 1235 as described with reference to FIG. 12.

At 2430, the method may include initiating a beam failure recovery in response to the signaling received from the UE. The operations of 2430 may be performed in accordance with examples as disclosed herein. In some examples, aspects of the operations of 2430 may be performed by a beam failure recovery manager 1235 as described with reference to FIG. 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving one or more reference signals from a base station on a first beam used for communications between the UE and the base station; and transmitting signaling indicating a beam failure based at least in part on one or more measurements of the one or more reference signals and at least one beam failure parameter, wherein the at least one beam failure parameter is adjusted based at least on part on interference associated with the first beam that is measured based at least in part on the one or more reference signals.

Aspect 2: The method of aspect 1, wherein the at least one beam failure parameter includes a beam failure indication (BFI) that is determined for each of a plurality of periods in which a first periodic reference signal of the one or more reference signals is measured, and wherein the method further comprises: applying a first adjustment to a BFI count when a number of consecutive BFIs is less than a threshold value, and applying a second adjustment to the BFI count when the number of consecutive BFIs is equal to or greater than the threshold value, and wherein the determining to declare the beam failure is based at least in part on an adjusted BFI count.

Aspect 3: The method of aspect 2, wherein the first adjustment or the second adjustment to the BFI count is reset to zero when a subsequent period of the plurality of periods fails to generate a BFI.

Aspect 4: The method of aspect 3, wherein the first adjustment of the BFI count triggers a beam failure declaration more slowly than the unadjusted BFI count, and the second adjustment of the BFI count triggers the beam failure declaration more quickly than the unadjusted BFI count.

Aspect 5: The method of any of aspects 2 through 4, further comprising: transmitting, to the base station, a beam failure declaration based at least in part on the number of consecutive BFIs meeting a maximum consecutive BFI count threshold before an expiration of a beam failure declaration timer.

Aspect 6: The method of any of aspects 1 through 5, further comprising: starting, at a medium access control (MAC) layer of the UE, a beam failure recovery (BFR) timer responsive to a beam failure indication (BFI) provided by a physical layer of the UE, initiating, at the MAC layer when a maximum consecutive BFI count threshold is reached, one or more of: a random access procedure irrespective of a status of the BFR timer, a transmission of a request for an aperiodic reference signal from the base station while the BFR timer is unexpired, or a transmission of uplink control information (UCI) to the base station that indicates the beam failure due to interference while the BFR timer is unexpired.

Aspect 7: The method of any of aspects 1 through 6, further comprising: receiving, from the base station, configuration information that provides the at least one beam failure parameter; and receiving, from the base station in one or more of DCI or a medium access control (MAC) control element, an indication to enable adjustments of the at least one beam failure parameter.

Aspect 8: The method of any of aspects 1 through 7, further comprising: determining, for each of a plurality of periods of a first periodic reference signal of the one or more reference signals, whether a beam failure indication (BFI) is detected, and wherein the at least one beam failure parameter includes an adaptive maximum BFI count threshold that is used to determine when to declare the beam failure.

Aspect 9: The method of aspect 8, further comprising: increasing the adaptive maximum BFI count threshold based at least on part on determining that a BFI is detected for a first number of consecutive periods of the plurality of periods that is less than a consecutive BFI threshold value; or decreasing the adaptive maximum BFI count threshold based at least in part on determining that the BFI is detected for a second number of consecutive periods of the plurality of periods that is greater than or equal to the consecutive BFI threshold value.

Aspect 10: The method of any of aspects 1 through 9, wherein the at least one beam failure parameter includes a block error rate (BLER) threshold value that is used to determine whether to provide a beam failure indication (BFI), and wherein the BLER threshold value is adjusted based at least on part on one or more of a measured channel condition associated with the first beam, a service requirement associated with the communications between the UE and the base station, or any combinations thereof.

Aspect 11: The method of aspect 10, wherein the BLER threshold value is increased based at least in part on a measured interference of the first beam being equal to or greater than a measurement criteria, and the BLER threshold value is decreased based at least in part on the measured interference of the first beam being less than the measurement criteria.

Aspect 12: The method of aspect 11, wherein the BLER threshold value is adjusted based at least in part on multiple configured interference measurement ranges, multiple configured service requirements, an algorithm to calculate the BLER threshold value, or any combinations thereof.

Aspect 13: The method of any of aspects 10 through 12, wherein the service requirement includes a quality of service (QoS) target for one or more of a packet error rate, an average latency, an average data rate, or any combinations thereof.

Aspect 14: The method of any of aspects 10 through 13, wherein the BLER threshold value is adjusted at the UE based at least in part on measured channel conditions or service requirements, or is adjusted based at least in part on signaling from the base station that indicates an adjustment to the BLER threshold value.

Aspect 15: The method of any of aspects 10 through 14, further comprising: receiving configuration information from the base station that indicates a plurality of different BLER threshold values, one or more adaptive BLER threshold calculation algorithms, or any combinations thereof and adjusting the BLER threshold value based at least in part on the configuration information, downlink signaling in a medium access control (MAC) control element or DCI, or any combinations thereof.

Aspect 16: A method for wireless communication at a base station, comprising: configuring a UE for an interference-based beam failure declaration based at least in part on one or more beam failure parameters and an interference determination associated with a first beam used for communications between the UE and the base station, wherein the one or more beam failure parameters are adjusted based at least on part on the interference determination associated with the first beam and the interference-based beam failure declaration is provided based at least in part on the adjusted beam failure parameters; transmitting one or more reference signals to the UE on the first beam, wherein the one or more beam failure parameters are based at least in part on measurements of the one or more reference signals; receiving signaling from the UE indicating a beam failure; and initiating a beam failure recovery in response to the signaling received from the UE.

Aspect 17: The method of aspect 16, wherein the one or more beam failure parameters include a beam failure indication (BFI) that is determined for each of a plurality of periods in which a first periodic reference signal of the one or more reference signals is measured, and wherein the method further comprises: configuring a first adjustment to a BFI count when a number of consecutive BFIs is less than a threshold value, and a second adjustment to the BFI count when the number of consecutive BFIs is equal to or greater than the threshold value, and wherein the beam failure declaration is based at least in part on an adjusted BFI count.

Aspect 18: The method of aspect 17, further comprising: configuring the UE to transmit the beam failure declaration based at least in part on the number of consecutive BFIs meeting a maximum consecutive BFI count threshold before an expiration of a beam failure declaration timer.

Aspect 19: The method of any of aspects 16 through 18, further comprising: transmitting, to the UE, in one or more of DCI or a medium access control (MAC) control element, an indication to enable adjustments of the one or more beam failure parameters.

Aspect 20: The method of any of aspects 16 through 19, wherein the configuring further comprises: configuring an adaptive maximum BFI count threshold for determining when to declare the beam failure, wherein the adaptive maximum BFI count threshold is increased based at least on part on determining that a BFI is detected for a first number of consecutive periods of the plurality of periods that is less than a consecutive BFI threshold value, or the adaptive maximum BFI count threshold is decreased based at least in part on determining that the BFI is detected for a second number of consecutive periods of the plurality of periods that is greater than or equal to the consecutive BFI threshold value Aspect 21: The method of any of aspects 16 through 20, wherein the one or more beam failure parameters include a block error rate (BLER) threshold value that is used to determine a beam failure indication (BFI), and wherein the BLER threshold value is configured to be adjusted based at least on part on one or more of a measured channel condition associated with the first beam, a service requirement associated with the communications between the UE and the base station, or any combinations thereof.

Aspect 22: The method of aspect 21, wherein the BLER threshold value is increased based at least in part on a measured interference of the first beam being equal to or greater than a measurement criteria, and the BLER threshold value is decreased based at least in part on the measured interference of the first beam being less than the measurement criteria.

Aspect 23: The method of aspect 22, wherein the configuring further comprises: configuring a plurality of channel condition measurement ranges that are each associated with a different BLER threshold value, configuring a plurality of service requirements that are each associated with different BLER threshold values, configuring an algorithm to calculate the BLER threshold value, or any combinations thereof.

Aspect 24: The method of any of aspects 21 through 23, further comprising: transmitting, to the UE, signaling to indicate an adjustment to the BLER threshold value.

Aspect 25: An apparatus for wireless communication at a UE, comprising a processor; memory coupled with the processor; and instructions stored in the memory and executable by the processor to cause the apparatus to perform a method of any of aspects 1 through 15.

Aspect 26: An apparatus for wireless communication at a UE, comprising at least one means for performing a method of any of aspects 1 through 15.

Aspect 27: A non-transitory computer-readable medium storing code for wireless communication at a UE, the code comprising instructions executable by a processor to perform a method of any of aspects 1 through 15.

Aspect 28: An apparatus for wireless communication at a base station, comprising a processor; memory coupled with the processor; and instructions stored in the memory and executable by the processor to cause the apparatus to perform a method of any of aspects 16 through 24.

Aspect 29: An apparatus for wireless communication at a base station, comprising at least one means for performing a method of any of aspects 16 through 24.

Aspect 30: A non-transitory computer-readable medium storing code for wireless communication at a base station, the code comprising instructions executable by a processor to perform a method of any of aspects 16 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network device, control signaling that includes an indication to enable adjustments of at least one beam failure parameter;
   receiving a plurality of instances of one or more reference signals from the network device on a first beam used for communications between the UE and the network device; and
   transmitting signaling indicating a beam failure based at least in part on one or more measurements of the one or more reference signals and the at least one beam failure parameter, wherein the at least one beam failure parameter is adjusted in accordance with the control signaling and based at least on part on transient interference associated with the first beam being measured in less than a threshold quantity of consecutive instances of the plurality of instances of the one or more reference signals, the threshold quantity being two or more.

2. The method of claim 1, wherein:
   the at least one beam failure parameter includes a beam failure indication (BFI) that is determined for each of a plurality of periods in which a first periodic reference signal of the one or more reference signals is measured, and wherein the method further comprises:
   applying a first adjustment to a BFI count based at least in part on a number of consecutive BFIs being less than a threshold value, the threshold value being two or more, and applying a second adjustment to the BFI count based at least in part on the number of consecutive BFIs being equal to or greater than the threshold value, and wherein determining to declare the beam failure is based at least in part on an adjusted BFI count.

3. The method of claim 2, wherein the first adjustment or the second adjustment to the BFI count is reset to zero when a subsequent period of the plurality of periods fails to generate a corresponding BFI.

4. The method of claim 3, wherein the first adjustment of the BFI count triggers a beam failure declaration more slowly than an unadjusted BFI count, and the second adjustment of the BFI count triggers the beam failure declaration more quickly than the unadjusted BFI count.

5. The method of claim 2, further comprising:
   transmitting, to the network device, a beam failure declaration based at least in part on the number of consecutive BFIs meeting a maximum consecutive BFI count threshold before an expiration of a beam failure declaration timer.

6. The method of claim 1, further comprising:
   starting, at a medium access control (MAC) layer of the UE, a beam failure recovery (BFR) timer responsive to a beam failure indication (BFI) provided by a physical layer of the UE, and
   initiating, at the MAC layer when a maximum consecutive BFI count threshold is reached, one or more of:
   a random access procedure irrespective of a status of the BFR timer,
   a transmission of a request for an aperiodic reference signal from the network device while the BFR timer is unexpired, or
   a transmission of uplink control information (UCI) to the network device that indicates the beam failure due to interference while the BFR timer is unexpired.

7. The method of claim 1, further comprising:
   receiving, from the network device, configuration information that provides the at least one beam failure parameter, wherein the control signaling comprises; one or more of downlink control information (DCI) or a medium access control (MAC) control element.

8. The method of claim 1, further comprising:
determining, for each of a plurality of periods of a first periodic reference signal of the one or more reference signals, whether a beam failure indication (BFI) is detected, and wherein the at least one beam failure parameter includes an adaptive maximum BFI count threshold that is used to determine when to declare the beam failure.

9. The method of claim 8, further comprising:
increasing the adaptive maximum BFI count threshold based at least on part on determining that the BFI is detected for a first number of consecutive periods of the plurality of periods that is less than a consecutive BFI threshold value; or
decreasing the adaptive maximum BFI count threshold based at least in part on determining that the BFI is detected for a second number of consecutive periods of the plurality of periods that is greater than or equal to the consecutive BFI threshold value.

10. The method of claim 1, wherein the at least one beam failure parameter includes a block error rate (BLER) threshold value that is used to determine whether to provide a beam failure indication (BFI), and wherein the BLER threshold value is adjusted based at least on part on one or more of a measured channel condition associated with the first beam, a service requirement associated with the communications between the UE and the network device, or any combinations thereof.

11. The method of claim 10, wherein the BLER threshold value is increased based at least in part on a measured interference of the first beam being equal to or greater than a measurement criteria, and the BLER threshold value is decreased based at least in part on the measured interference of the first beam being less than the measurement criteria.

12. The method of claim 11, wherein the BLER threshold value is adjusted based at least in part on multiple configured interference measurement ranges, multiple configured service requirements, an algorithm to calculate the BLER threshold value, or any combinations thereof.

13. The method of claim 10, wherein the service requirement includes a quality of service (QOS) target for one or more of a packet error rate, an average latency, an average data rate, or any combinations thereof.

14. The method of claim 10, wherein the BLER threshold value is adjusted at the UE based at least in part on measured channel conditions or service requirements, or is adjusted based at least in part on second signaling from the network device that indicates an adjustment to the BLER threshold value.

15. The method of claim 10, further comprising:
receiving configuration information from the network device that indicates a plurality of different BLER threshold values, one or more adaptive BLER threshold calculation algorithms, or any combinations thereof; and
adjusting the BLER threshold value based at least in part on the configuration information, downlink signaling in a medium access control (MAC) control element or downlink control information (DCI), or any combinations thereof.

16. A method for wireless communication at a network device, comprising:
transmitting control signaling that configures a user equipment (UE) for an interference-based beam failure declaration based at least in part on at least one beam failure parameter and measurement of transient interference associated with a first beam used for communications between the UE and the network device, wherein the control signaling includes an indication to enable adjustments of the at least one beam failure parameter, wherein the at least one beam failure parameter are adjusted in accordance with the control signaling based at least on part on the measurement of transient interference in less than a threshold quantity of consecutive instances of one or more reference signals associated with the first beam, the threshold quantity being two or more, and the interference-based beam failure declaration is provided based at least in part on the adjusted at least one beam failure parameter;
transmitting a plurality of instances of the one or more reference signals to the UE on the first beam, wherein the at least one beam failure parameter are based at least in part on measurements of the one or more reference signals;
receiving signaling from the UE indicating a beam failure; and
initiating a beam failure recovery in response to the signaling received from the UE.

17. The method of claim 16, wherein:
the at least one beam failure parameter include a beam failure indication (BFI) that is determined for each of a plurality of periods in which a first periodic reference signal of the one or more reference signals is measured, and wherein the method further comprises:
configuring a first adjustment to a BFI count based at least in part on a number of consecutive BFIs being less than a threshold value, the threshold value being two or more, and a second adjustment to the BFI count based at least in part on the number of consecutive BFIs being equal to or greater than the threshold value, and wherein a beam failure declaration is based at least in part on an adjusted BFI count.

18. The method of claim 17, further comprising:
configuring the UE to transmit the beam failure declaration based at least in part on the number of consecutive BFIs meeting a maximum consecutive BFI count threshold before an expiration of a beam failure declaration timer.

19. The method of claim 16 wherein the control signaling comprises one or more of downlink control information (DCI) or a medium access control (MAC) control element.

20. The method of claim 16, further comprising:
configuring, for the UE, an adaptive maximum BFI count threshold for determining when to declare the beam failure, wherein the adaptive maximum BFI count threshold is increased based at least on part on determining that a BFI is detected for a first number of consecutive periods of a plurality of periods that is less than a consecutive BFI threshold value, or the adaptive maximum BFI count threshold is decreased based at least in part on determining that the BFI is detected for a second number of consecutive periods of the plurality of periods that is greater than or equal to the consecutive BFI threshold value.

21. The method of claim 16, wherein the at least one beam failure parameter includes a block error rate (BLER) threshold value that is used to determine a beam failure indication (BFI), and wherein the BLER threshold value is configured to be adjusted based at least on part on one or more of a measured channel condition associated with the first beam, a service requirement associated with the communications between the UE and the network device, or any combinations thereof.

22. The method of claim 21, wherein the BLER threshold value is increased based at least in part on a measured interference of the first beam being equal to or greater than a measurement criteria, and the BLER threshold value is decreased based at least in part on the measured interference of the first beam being less than the measurement criteria.

23. The method of claim 22, further comprising:
configuring, for the UE, a plurality of channel condition measurement ranges that are each associated with a different BLER threshold value, configuring a plurality of service requirements that are each associated with different BLER threshold values, configuring an algorithm to calculate the BLER threshold value, or any combinations thereof.

24. The method of claim 21, further comprising:
transmitting, to the UE, second signaling to indicate an adjustment to the BLER threshold value.

25. An apparatus for wireless communication at a user equipment (UE), comprising:
one or more processors;
memory coupled with the one or more processors; and
instructions stored in the memory and executable by the one or more processors to cause the apparatus to:
receive, from a network device, control signaling that includes an indication to enable adjustments of at least one beam failure parameter;
receive a plurality of instances of one or more reference signals from the network device on a first beam used for communications between the UE and the network device; and
transmit signaling indicating a beam failure based at least in part on one or more measurements of the one or more reference signals and the at least one beam failure parameter, wherein the at least one beam failure parameter is adjusted in accordance with the control signaling and based at least on part on transient interference associated with the first beam being measured in less than a threshold quantity of consecutive instances of the plurality of instances of the one or more reference signals, the threshold quantity being two or more.

26. The apparatus of claim 25, wherein:
the at least one beam failure parameter includes a beam failure indication (BFI) that is determined for each of a plurality of periods in which a first periodic reference signal of the one or more reference signals is measured, and wherein the instructions are further executable by the one or more processors to cause the apparatus to:
apply a first adjustment to a BFI count based at least in part on a number of consecutive BFIs being less than a threshold value, the threshold value being two or more, and applying a second adjustment to the BFI count based at least in part on the number of consecutive BFIs being equal to or greater than the threshold value, and wherein determining to declare the beam failure is based at least in part on an adjusted BFI count.

27. The apparatus of claim 25, wherein the instructions are further executable by the one or more processors to cause the apparatus to:
determine, for each of a plurality of periods of a first periodic reference signal of the one or more reference signals, whether a beam failure indication (BFI) is detected, and wherein the at least one beam failure parameter includes an adaptive maximum BFI count threshold that is used to determine when to declare the beam failure.

28. The apparatus of claim 25, wherein the at least one beam failure parameter includes a block error rate (BLER) threshold value that is used to determine whether to provide a beam failure indication (BFI), and wherein the BLER threshold value is adjusted based at least on part on one or more of a measured channel condition associated with the first beam, a service requirement associated with the communications between the UE and the network device, or any combinations thereof.

29. An apparatus for wireless communication at a network device, comprising:
one or more processors;
memory coupled with the one or more processors; and
instructions stored in the memory and executable by the one or more processors to cause the apparatus to:
transmit control signaling that configures a user equipment (UE) for an interference-based beam failure declaration based at least in part on at least one beam failure parameter and measurement of transient interference associated with a first beam used for communications between the UE and the network device, wherein the control signaling includes an indication to enable adjustments of the at least one beam failure parameter, wherein the at least one beam failure parameter are adjusted in accordance with the control signaling based at least on part on the measurement of transient interference in less than a threshold quantity of consecutive instances of one or more reference signals associated with the first beam, the threshold quantity being two or more, and the interference-based beam failure declaration is provided based at least in part on the adjusted at least one beam failure parameter;
transmit a plurality of instances of the one or more reference signals to the UE on the first beam, wherein the at least one beam failure parameter are based at least in part on measurements of the one or more reference signals;
receive signaling from the UE indicating a beam failure; and
initiate a beam failure recovery in response to the signaling received from the UE.

30. The apparatus of claim 29, wherein:
the at least one beam failure parameter include a beam failure indication (BFI) that is determined for each of a plurality of periods in which a first periodic reference signal of the one or more reference signals is measured, and wherein the instructions are further executable by the one or more processors to cause the apparatus to:
configure a first adjustment to a BFI count based at least in part on a number of consecutive BFIs being less than a threshold value, the threshold value being two or more, and a second adjustment to the BFI count based at least in part on the number of consecutive BFIs being equal to or greater than the threshold value, and wherein a beam failure declaration is based at least in part on an adjusted BFI count.

* * * * *